US010608904B2

(12) United States Patent
Bosworth et al.

(10) Patent No.: US 10,608,904 B2
(45) Date of Patent: Mar. 31, 2020

(54) METHODS AND APPARATUS TO COORDINATE RECEIPT OF MONITORING INFORMATION

(71) Applicant: The Nielsen Company (US), LLC, New York, NY (US)

(72) Inventors: Alan N. Bosworth, Odessa, FL (US); Kevin K. Gaynor, Sunnyvale, CA (US); Daniel J. Krotov, Trinity, FL (US); Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 276 days.

(21) Appl. No.: 15/143,516

(22) Filed: Apr. 30, 2016

(65) Prior Publication Data
US 2016/0323162 A1    Nov. 3, 2016

Related U.S. Application Data

(60) Provisional application No. 62/155,266, filed on Apr. 30, 2015.

(51) Int. Cl.
H04L 12/26    (2006.01)
G06Q 30/02    (2012.01)
H04L 29/08    (2006.01)

(52) U.S. Cl.
CPC ......... H04L 43/06 (2013.01); G06Q 30/0242 (2013.01); H04L 67/1002 (2013.01); H04L 67/22 (2013.01)

(58) Field of Classification Search
None
See application file for complete search history.

(56) References Cited

U.S. PATENT DOCUMENTS 7,623,823 B2    11/2009  Zito et al.
7,639,618 B2    12/2009  Bondi
(Continued)

OTHER PUBLICATIONS

Juday, "Advanced Azure Queuing with the Sessions and the Service Bus," retrieved from http://www.codeguru.com/columns/experts/advanced-azure-queuing-with-the-sessions-and-the-service-bus.htm, Oct. 15, 2012 (21 pages).
(Continued)

Primary Examiner — Esther B. Henderson
Assistant Examiner — Dae Kim
(74) Attorney, Agent, or Firm — Hanley, Flight & Zimmerman, LLC

(57) ABSTRACT

Methods, apparatus, systems and articles of manufacture are disclosed to coordinate receipt of monitoring information. An example method includes, in response to a first received message requesting a first session identifier, creating, by executing an instruction with a processor of a load balancer, a first session identifier including an impression processor identifier. The impression processor identifier is to identify an impression processor to process subsequent messages that include the first session identifier. The first session identifier is transmitted to a media device to be used by the media device when transmitting the subsequent messages. The first received message is routed to the impression processor identified by the first session identifier. The impression processor is to credit a media presentation identified in a payload of the first received message.

18 Claims, 13 Drawing Sheets

(56) References Cited

U.S. PATENT DOCUMENTS

| | | | |
|---|---|---|---|
| 8,135,606 B2 | 3/2012 | Dupree | |
| 8,358,966 B2 | 1/2013 | Zito et al. | |
| 8,452,797 B1 | 5/2013 | Paleja et al. | |
| 8,763,012 B2 | 6/2014 | Hosie et al. | |
| 8,910,195 B1 | 12/2014 | Barney et al. | |
| 2006/0233106 A1* | 10/2006 | Achlioptas | H04L 45/745 370/235 |
| 2011/0320273 A1* | 12/2011 | Miranda-Steiner | G06Q 30/02 705/14.49 |
| 2012/0158954 A1* | 6/2012 | Heffernan | H04L 43/04 709/224 |
| 2012/0197751 A1 | 8/2012 | Zatkin et al. | |
| 2014/0172813 A1* | 6/2014 | Yan | G06F 17/30864 707/706 |
| 2014/0278623 A1 | 9/2014 | Martinez et al. | |
| 2014/0337130 A1* | 11/2014 | Lawson | G06Q 30/0255 705/14.53 |
| 2014/0344953 A1* | 11/2014 | Roundtree | G06F 21/10 726/28 |
| 2015/0112791 A1 | 4/2015 | Jain | |
| 2015/0149528 A1 | 5/2015 | Miluzzo et al. | |
| 2015/0347112 A1* | 12/2015 | Kosmynka | G06Q 30/0201 717/176 |
| 2016/0164824 A1* | 6/2016 | Kalyanaraman | H04W 4/14 709/206 |
| 2016/0232570 A1* | 8/2016 | Wilson | G06Q 30/0257 |
| 2017/0206552 A1* | 7/2017 | Rajkumar | G06Q 30/0255 |

OTHER PUBLICATIONS

Thompson et al., "Disruptor: High performance alternative to bounded queues for exchanging data between concurrent threads," LMAX, May 2011 (11 pages).

Du Pre Gauntt, "Cloud Computing for Media People," vol. 1.0, Winter 2010 (64 pages).

"Uniqid," retrieved from http://php.net/manual/en/function.uniqid.php on Sep. 21, 2015 (27 pages).

* cited by examiner

METHODS AND APPARATUS TO COORDINATE RECEIPT OF MONITORING INFORMATION

RELATED APPLICATION

This patent claims the benefit of U.S. Provisional Patent Application No. 62/155,266, which was filed on Apr. 30, 2015 and was entitled "CLOUD-BASED MEASUREMENT OF DISTRIBUTED MEDIA IMPRESSIONS." U.S. Provisional Patent Application No. 62/155,266 is hereby incorporated by reference in its entirety.

FIELD OF THE DISCLOSURE

This disclosure relates generally to receiving monitoring information, and, more particularly, to methods and apparatus to coordinate receipt of monitoring information.

BACKGROUND

Media providers and/or other entities such as, for example, advertising companies, broadcast networks, etc. are often interested in the viewing, listening, and/or media behavior of audience members and/or the public in general. The media usage and/or exposure habits of audience members as well as demographic data about the audience members are collected and used to statistically determine the size and demographics of an audience of interest.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
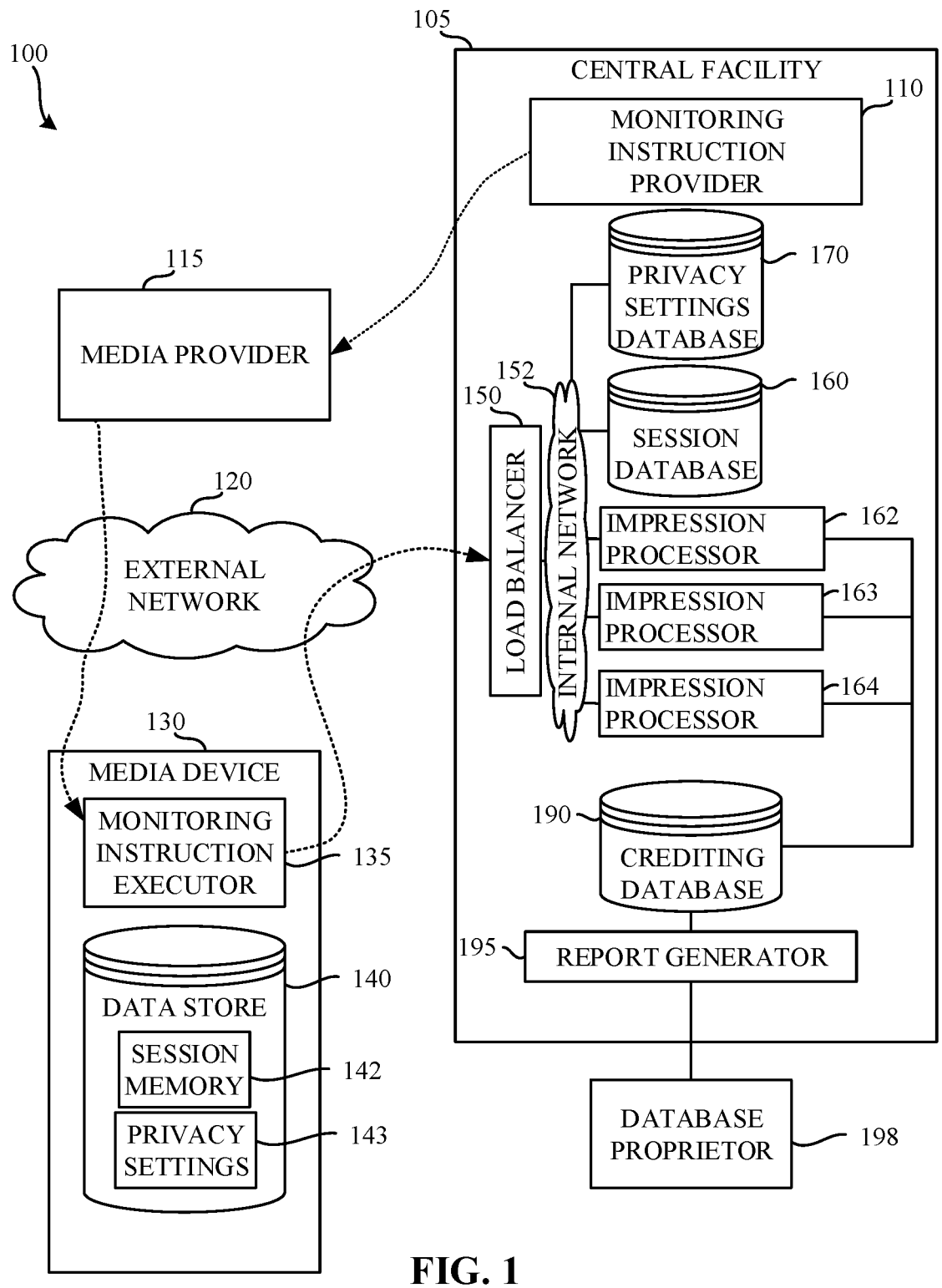
FIG. 1 is a block diagram of an example environment of use including an example central facility to coordinate receipt of monitoring information in accordance with the teachings of this disclosure.

Monitoring companies desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc. To facilitate monitoring the media presentations made at the media devices, the media devices are instructed to report monitoring information to the monitoring company.

Techniques for monitoring user access to Internet media such as web pages, advertisements, content, and/or other resources (e.g., audio, video, interactive content, etc.) have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these views of cached media. Thus, server logs are susceptible to both over-counting and under-counting errors.

Known systems to log client-side impressions are tailored to function on specific devices or very narrow classes of related devices. Therefore, the presence of a multitude of devices in the monitored environment creates problems for monitoring media impressions, including a high cost of logging impressions on all available devices. Furthermore, such systems are implemented on each application that was desired to be monitored on such devices, thereby creating additional overhead for the developers of such applications.

Examples disclosed herein leverage cloud infrastructure, such as generic computing hardware capable of executing generic and/or specialized software in a physical machine(s) and/or a virtual machine(s) in a manner that is opaque to outside devices. As used herein, the cloud and/or the cloud infrastructure are defined to be physical and/or virtual computing systems that can have computing resource(s) dynamically added and/or removed without impacting the service(s) provided by those physical and/or virtual computing systems. Examples disclosed herein provide an application programming interface to enable a wide variety of devices to provide client side impression information for monitoring and aggregation.

As used herein, the term "media" includes any type of content and/or advertisement delivered via any type of distribution medium. Thus, media includes television programming or advertisements, radio programming or advertisements, movies, web sites, streaming media, etc. Example methods, apparatus, and articles of manufacture disclosed herein facilitate coordination of receipt of monitoring information concerning media presentations at media devices. Such media devices may include, for example, Internet-enabled televisions, personal computers, Internet-enabled mobile handsets (e.g., a smartphone), video game consoles (e.g., Xbox®, PlayStation® 3), tablet computers (e.g., an iPad®), digital media players (e.g., AppleTV®, a Roku® media player, a Slingbox®, etc.), etc. In some examples, monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or device and/or user-identifying information (e.g., a username, a media access control (MAC) address, an Internet Protocol (IP) address, an Apple ID, a panelist identifier, etc.).

Media devices such as tablet computers (e.g., an Apple iPad®, an Asus Transformer™, etc.) present media using applications (sometimes referred to as "apps") that access, retrieve, request, and/or present media (e.g., Internet media). In some examples, media devices use a browser to access, retrieve, request, and/or present media. Many different "apps" exist and can be downloaded by users through app stores such as, for example, Apple iTunes®, Google Play®, etc. Hundreds, if not thousands, of apps are available in the app stores that enable presentation of media. Moreover, thousands, if not millions, of different websites and/or Internet media sites may be presented by the media device. In some examples, "apps" can be downloaded and/or installed from a location other than an app store such as, for example, a website, a memory device (e.g., an SD card, a CD-ROM, etc.). Examples of such applications include, but are not limited to, Hulu®, Netflix®, HBO Go®, etc. In some examples, an "app" may be a web application that is executed by a browser of the media device. In examples disclosed herein, the "apps" are implemented with monitoring instructions that cause the media device to report monitoring information to a central facility of the monitoring company.

When reporting monitoring information to the central facility, the media device uses a session ID. The session ID used to represent a monitored session of media presentation activity at the media device. For example, a first session ID may correspond to a first period of time where a user was interacting with the media device. During that first usage period, monitoring information is reported to the central facility by the media device using the first session ID. If, for example, the user stopped using the media device for a threshold period of time (e.g., ten minutes, fifteen minutes, thirty minutes, etc.) and later resumed use of the media device, a second session ID would be issued corresponding to the second usage period, and would be used when reporting monitoring information for the second usage period.

In examples disclosed herein, monitoring information is received for processing at a central facility. The central facility collects and stores the monitoring information and creates session IDs to be used by the media device(s) that are reporting monitoring information. In some examples, using a single server to receive monitoring information can result in processing delays of the monitoring information and/or timeouts of attempts to transmit monitoring information from the media device. If an attempt to transmit monitoring information were to time out, it is possible that the monitoring entity might not receive some or all of the monitoring information transmitted by the media device, thereby causing errors and/or unreliability in subsequent reports created based on the received monitoring information. In examples disclosed herein, the central facility utilizes a load balancer to receive monitoring information and acknowledge receipt of the monitoring information to the media device. The load balancer distributes monitoring messages to one of multiple impression processors at the central facility for further processing.

In some examples, the media device may send multiple messages including monitoring information corresponding to a single session. In examples disclosed herein, the load balancer identifies the session identifying information and forwards the monitoring information to an impression processor associated with the session. Multiple messages corresponding to the same session are thereby forwarded to a same impression processor for handling. Processing monitoring information corresponding to a single session at the same impression processor increases accuracy of crediting, as the session can be treated as a whole, rather than as smaller parts of the session. In examples disclosed herein, when generating the session ID, the server includes an impression processor identifier. The impression processor identifier enables the load balancer to quickly identify the impression processor to which the monitoring message should be routed.

FIG. 1 is a block diagram of an example environment of use 100 including an example central facility 105 to coordinate receipt of monitoring information in accordance with the teachings of this disclosure. A monitoring instruction provider 110 of the central facility 105 provides monitoring instructions to a media provider 115. The media provider 115 implements the monitoring instructions in, for example, a web site, an "app," etc. The monitoring instructions are provided to the media device 130 via the external network 120. The example media device includes a monitoring instruction executor 135 to execute the monitoring instructions. The monitoring instruction executor 135 communicates with the central facility 105 to report monitoring information. While a single media device 130 is shown in the illustrated example of FIG. 1, in normal use, many media devices 130 (e.g., hundreds of media devices, thousands of media devices, etc.) will report monitoring information to the central facility 105. In examples disclosed herein, the example monitoring instruction executor 135 locally stores a session ID provided by the central facility in a session memory 142 of a data store 140 of the media device 130 and, in some examples, stores privacy settings 143 in the data store 143. The example central facility 105 includes a load balancer 150, an internal network 152, a session database 160, impression processor(s) 162, 163, 164, a privacy settings database 170, a crediting database 190, and a report generator 195.

As noted above, the example central facility 105 of the illustrated example of FIG. 1 includes the monitoring instruction provider 110, the load balancer 150, the internal network 152, the session database 160, the impression processor(s) 162, 163, 164, the privacy settings database 170, the crediting database 190, and the report generator 195. In examples disclosed herein, the example central facility 105 is operated by an audience measurement entity such as, for example, The Nielsen Company (US), LLC. In the illustrated example of FIG. 1, a single central facility 105 is shown. However, in some examples, multiple central facilities may be used to collect monitoring information from media device(s) 130. For example, a first central facility may be located in a first geographic region (e.g., the eastern coast of the United States of America) and a second central facility may be located in a second geographic region different from the first central facility (e.g., the western coast of the United States of America). The example crediting database 190 of one of the central facilities may store monitoring information from the other central facility(ies) to prepare an aggregated monitoring report.

The example monitoring instruction provider 110 of the illustrated example of FIG. 1 provides instructions to an application developer(s) of the media provider 115 to facilitate creation of web pages and/or "apps" that include the monitoring instructions. In examples disclosed herein, the monitoring instructions are provided as part of a software development kit (SDK). In some examples, the SDK is provided such that the application developer(s) can integrate the monitoring instructions into existing applications. While in the illustrated example an SDK is provided, monitoring instructions provided via the SDK may be provided in any other fashion. For example, the monitoring components may be provided as an application programming interface (API), a plugin, an add-on, etc. An example approach to providing monitoring instructions to the media provider 115 such that they are ultimately executed by a media device 130 is disclosed in U.S. patent application Ser. No. 13/828,971, which is hereby incorporated by reference in its entirety.

The example monitoring instruction provider 110 provides monitoring instructions to the media provider 115. The example media provider 115 of the illustrated example of FIG. 1 includes one or more servers providing Internet media (e.g., web pages, audio, video, images, etc.). The example media provider 115 of FIG. 1 may be implemented by any provider(s) of media such as a digital media broadcaster, multicaster, or unicaster (e.g., a cable television service, a fiber-optic television service, an IPTV provider, etc.) and/or an on-demand digital media provider (e.g., an Internet streaming video and/or audio services such as Netflix®, YouTube®, Hulu®, Pandora®, Last.fm®, etc.), a web page, and/or any other provider of media. Additionally or alternatively, the example media provider 115 may not be an Internet provider. For example, the media providers may be on a private, a virtual private, and/or semi-private network (e.g., a LAN). The example media provider 115 instruments the monitoring instructions such that they are executed by the media device 130 when presenting media. In examples disclosed herein, the example monitoring instructions may be instrumented in, for example, a webpage (e.g., as Javascript instructions, etc.), an instrumented application, etc. The monitoring instructions and/or the media are provided to the media device 130 via the external network 120.

The example external network 120 of the illustrated example of FIG. 1 is a wide area network (WAN) such as the Internet. However, in some examples, local networks may additionally or alternatively be used. For example, multiple networks (e.g., a cellular network, an Ethernet network, etc.) may be utilized to implement the example external network 120 of FIG. 1.

The example media device 130 of the illustrated example shown in FIG. 1 is a device that retrieves media from the media provider 110 for presentation. In some examples, the media device 130 is capable of directly presenting media (e.g., via a display) while, in other examples, the media device 130 presents the media on separate media presentation equipment (e.g., speakers, a display, etc.). Thus, as used herein "media devices" may or may not be able to present media without assistance from a second device. Media devices are typically consumer electronics. For example, the media device 130 of the illustrated example is a tablet such as an Apple iPad™, and thus, is capable of directly presenting media (e.g., via an integrated display and speakers). While in the illustrated example, a tablet is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

In the illustrated example of FIG. 1, the example media device 130 receives the monitoring instructions from the media provider 115. However, the example media device 130 may receive the monitoring instructions from any other party such as, for example, an app store. In some examples, the monitoring instructions are installed on the media device 130 by the user by downloading an application from an app store (e.g. Apple iTunes, Google play, etc.). The example media device 130 includes the monitoring instruction executor 135 to execute the monitoring instructions. In examples disclosed herein, the example monitoring instruction executor 135 is implemented as computer-readable instructions executing on a logic circuit such as a processor of the media device 130.

The monitoring instruction executor 135 executes instructions (e.g., Java, java script, and/or any other computer language or script) that, when executed, cause the media device 130 to collect metadata corresponding to presented media and to send the metadata to the central facility 105 via an API call defined by the central facility 105.

In some examples, the monitoring instruction executor 135 uses an API call to initiate a session with the central facility 105, where subsequent API calls from the monitoring instruction executor 135 are provided to the central facility 105 and/or processed within the central facility 105 within the context of the session. In examples disclosed herein, the central facility 105 generates a unique session number based on information provided by the monitoring instruction executor 135 during session initiation, such as an application identifier of the app in which the monitoring instruction executor 135 is executing and/or a unique device identifier. The example central facility 105 responds to the session initiation API call with a response including a session identifier generated by the central facility.

Media devices such as the media device 130 of FIG. 1 traditionally include a data store 140 (e.g., a memory) for storing media and/or application executables. The example data store 140 of the illustrated example of FIG. 1 may be any device for storing data such as, for example, flash memory, magnetic media, optical media, etc. In the illustrated example, the data store 140 is random access memory of the media device 130. In some examples, the data store 140 is implemented using HyperText Markup Language version 5 (HTML5) local storage. However, the example data store 140 may additionally or alternatively be implemented using, for example a cookie cache of a browser of the media device 130. Furthermore, the data stored in the data store 140 may be in any data format such as, for example, binary data, comma delimited data, tab delimited data, structured query language (SQL) structures, etc. While in the illustrated example the data store 140 is illustrated as a single database, the data store 140 may be implemented by multiple databases, and/or be stored in multiple memory locations of the media device. In the illustrated example of FIG. 1, the example data store 140 includes session memory 142 to store a session ID provided by the central facility 105, and, in some examples, privacy settings 143 that control whether monitoring is to be performed. When reporting monitoring information to the central facility 105, the session ID is also reported to identify the media monitoring session to which the monitoring information corresponds. In some examples, the privacy settings 143 are communicated to the central facility 105 to ensure that if a user opted-out of being monitored but the settings stored on the media device 130 were cleared, that the user would not inadvertently be monitored without their consent.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People become panelists via, for example, a user interface presented on the media device 130 (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In some examples, the media device 130 may not allow access to identification information stored in the media device 130. For such instances, disclosed examples enable the central facility 105 to store a central facility provided identifier (e.g., an identifier managed and tracked by the central facility 105) in the media device 130 to track media impressions on the media device 130. For example, the central facility 105 may provide instructions in the monitoring instruction executor 135 to set a central facility provided identifier in memory space accessible by and/or allocated to the app, and the monitoring instruction executor 135 uses the identifier as a device/user identifier. In such examples, the central facility provided identifier set by the monitoring instruction executor 135 persists in the memory space even when the app and/or the monitoring instruction executor 135 are not running. In this manner, the same central facility provided identifier can remain associated with the media device 130 for extended durations (e.g., across multiple sessions). In some examples in which the monitoring instruction executor 135 sets an identifier in the media device 130, the central facility 130 may recruit a user of the media device 130 as a panelist, and may store user information collected from the user during a panelist registration process and/or collected by monitoring user activities/behavior via the media device 130 and/or any other device used by the user and monitored by the central facility 105. In this manner, the central facility 105 can associate user information of the user (from panelist data stored by the central facility 105) with media impressions attributed to the user on the media device 130.

Returning to the example central facility 105 of the illustrated example of FIG. 1, the example load balancer 150 of the illustrated example of FIG. 1 receives messages from the media device(s) 130. In the illustrated example of FIG. 1, the example load balancer 150 distributes incoming messages to an impression processor 162, 163, 164 based on a session identifier included in the incoming message(s). When the session identifiers are created, a round-robin load balancing algorithm is used to select a session identifier that causes distribution to a particular impression processor 162, 163, 164 via the internal network 152. However, any other approach to load balancing may additionally or alternatively be used such as, for example, a weighted round robin distribution approach, a random distribution approach, a least-number-of-connections distribution approach, etc. In examples disclosed herein, the example load balancer 150 might send multiple messages received from a single media device 130 to multiple different impression processors 162, 163, 164 based on corresponding different session identifiers.

The example internal network 152 of the illustrated example of FIG. 1 is a local area network (LAN). However, in some examples, other types of networks may additionally or alternatively be used such as, for example, a virtual private network (VPN), a wide area network (WAN), etc. In examples disclosed herein, the example internal network 152 is implemented as an Ethernet network. However, any other network type(s) and/or protocol(s) may additionally or alternatively be utilized to implement the example internal network 152 of FIG. 1.

In examples disclosed herein, the load balancer 150 stores session information in the example session database 160. The example session database 160 may be any device for storing data such as, for example, flash memory, magnetic media, optical media, etc. The example session database 160 of the illustrated example of FIG. 1 stores session information including, for example, a session identifier, and a time of last activity of the session. However, the example session database 160 may additionally or alternatively store any other information. Furthermore, the data stored in the session database 160 may be in any data format such as, for example, binary data, comma delimited data, tab delimited data, structured query language (SQL) structures, etc. An example data table that may be stored in the session database 160 is described below in connection with FIG. 3. While in the illustrated example the session database 160 is illustrated as single database, the session database 160 may be implemented by multiple databases, and/or be stored in multiple memory locations of the central facility 105. Moreover, in some examples, the session database 160 may be implemented as a component of the load balancer 150.

In examples disclosed herein, the privacy settings information is stored in the example privacy settings database 170. The privacy settings information indicates, for example, whether collection of monitoring information by an application and device combination is permitted by the user (e.g., an opt-in status, an opt-out status, etc.). The example privacy settings database 170 may be any device for storing data such as, for example, flash memory, magnetic media, optical media, etc. The example privacy settings database 170 of the illustrated example of FIG. 1 stores an application identifier, a device identifier, and an indication of whether collection is enabled for the application identifier and device identifier combination. However, the example privacy settings database 170 may additionally or alternatively store any other information. Furthermore, the data stored in the privacy settings database 170 may be in any data format such as, for example, binary data, comma delimited data, tab delimited data, structured query language (SQL) structures, etc. An example data table that may be stored in the privacy settings database 170 is described below in connection with FIG. 5. While in the illustrated example the privacy settings database 170 is illustrated as single database, the privacy settings database 170 may be implemented by multiple databases, and/or be stored in multiple memory locations of the central facility 105. Moreover, in some examples, the privacy settings database 170 may be implemented as a component of the load balancer 150.

The example impression processor(s) 162, 163, 164 of the illustrated example of FIG. 1 receive messages from the load balancer 150. In examples disclosed herein, the example impression processor(s) 162, 163, 164 are separate hardware computers. In some examples, the example impression processor(s) 162, 163, 164 may be implemented on a same physical hardware computer via, for example, a virtual computing system, a virtual container, etc. In some examples, various combinations of hardware computers and/or virtual computers may be used. While three impression processor(s) 162, 163, 164 are shown in the illustrated example of FIG. 1, any number of impression processor(s) may additionally or alternatively be used such as, for example, two impression processor(s), ten impression processor(s), one hundred impression processor(s). In some examples, impression processor(s) may dynamically be added to and/or removed from the central facility 105 on demand. Such dynamic scaling enables handling of varying amounts of media devices (e.g., one hundred thousand media devices, one million media devices, ten million media devices) reporting monitoring information substantially simultaneously (e.g., over a period of time of one hour) to be handled without loss of monitoring information reported by those media devices. For example, during a period of many incoming monitoring messages, additional impression processor(s) may be initialized to process the additional incoming monitoring messages. An example implementation of the impression processor 162 is disclosed in further detail in connection with FIG. 2B. The other impression processor(s) (e.g., the impression processor 163, the impression processor(s) 164) are implemented in the same fashion as the impression processor(s) 162 of FIGS. 1 and/or 2B.

In examples disclosed herein, each of the impression processor(s) 162, 163, 164 stores crediting information in a crediting database 190. The example crediting database 190 may be any device for storing data such as, for example, flash memory, magnetic media, optical media, etc. The example crediting database 190 of the illustrated example of FIG. 1 stores crediting information indicative of, for example, how long a particular piece of media was viewed by users, demographic information corresponding to different users, etc. However, the example crediting database 190 may additionally or alternatively store any other information. Furthermore, the data stored in the crediting database 190 may be in any data format such as, for example, binary data, comma delimited data, tab delimited data, structured query language (SQL) structures, etc. While in the illustrated example the crediting database 190 is illustrated as single database, the crediting database 190 may be implemented by multiple databases, and/or be stored in multiple memory locations of the central facility 105.

The example crediting database 190 enables the crediting information collected and/or generated by the multiple impression processor(s) 162, 163, 164 to be analyzed by the report generator 195. The example report generator 195 of the illustrated example of FIG. 1 generates reports indicative of media exposure metrics and/or application usage metrics based on one or more different types of media device(s) (e.g., personal computers, portable devices, mobile phones, tablets, etc.). For example, the report generator 195 compiles media exposure metrics based on the aggregated monitoring information collected in the crediting database 190. A report is then generated to indicate media exposure and/or application usage statistics. In some examples, the exposure measurements provide ratings information for different media (e.g., a particular television show, a particular website, a particular movie, etc.) In some examples, the exposure measurements indicate ratings information and/or usage statistics for different instrumented applications.

Additionally or alternatively, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the media device(s). Additionally or alternatively, the report may associate the media exposure metrics with metric indicators of the popularity of the artist, genre, song, title, etc., across one or more user characteristics selected from one or more demographic segment(s), one or more age group(s), one or more gender(s), and/or any other user characteristic(s).

In some examples, the report generator 195 is in communication with a database proprietor 198 to enable inclusion of demographic information in reports created by the report generator 195. In some examples, the report generator 195 cooperates with multiple database proprietors to allow for collection of demographic information from multiple sources. In some examples, the report generator 195 provides device and/or user identifiers collected via the monitoring messages reported by the mobile device(s) 130 to the database proprietor 198. The device/user identifier(s) of the illustrated example include identifiers that can be used by the database proprietor(s) 198 to identify the user or users of the media device 130, and to provide demographic information corresponding to the user(s). The central facility 105 of the audience measurement entity (AME) may provide (e.g., via the report generator 195) a log of device/user identifiers to the database proprietor 198. Example approaches for supplementing media measurement reports with demographic information provided by a database proprietor are disclosed Ser. No. 14/127,414, filed on Aug. 28, 2013, U.S. patent application Ser. No. 14/261,085, filed on Apr. 24, 2014, U.S. Provisional Patent Application Ser. No. 61/952,726, filed on Mar. 13, 2014, U.S. Provisional Patent Application Ser. No. 61/979,391, filed on Apr. 14, 2014, U.S. Provisional Patent Application Ser. No. 61/986,784, filed on Apr. 30, 2014, U.S. Provisional Patent Application Ser. No. 61/991,286, filed on May 9, 2014, and U.S. Provisional Patent Application Ser. No. 62/014,659, filed Jun. 19, 2014. The entireties of U.S. patent application Ser. Nos. 14/127,414, and 14/261,085, U.S. Provisional Patent Application Ser. No. 61/952,726, U.S. Provisional Patent Application Ser. No. 61/979,391, U.S. Provisional Patent Application Ser. No. 61/986,784, U.S. Provisional Patent Application Ser. No. 61/991,286, and U.S. Provisional Patent Application Ser. No. 62/014,659 are incorporated by reference herein.

In some examples, the media exposure metrics are used to determine demographic reach of streaming media, ratings for streaming media, engagement indices for streaming media, user affinities associated with streaming media, broadcast media, and/or any other audience measure metric associated with streaming media and/or locally stored media. While in the illustrated example, the media exposure metrics are used to provide information for streaming media, the media exposure metrics may be used to provide information for any other type of media such as, for example, websites, non-streaming media, etc. In some examples, the media exposure metrics are audience share metrics indicative of percentages of audiences for different applications and/or types of applications that accessed the same media. For example, a first percentage of an audience may be exposed to news media via a browser application, while a second percentage of the audience may be exposed to the same news media via a news reader application.

Although for simplicity, the above discussion focuses on a single media device 130 executing monitoring instructions provided by a single media provider 115 to transmit monitoring information to a single central facility 105, any number of any of these elements may be present. For example, in a typical implementation, it is expected that multiple media providers will offer multiple different instrumented apps and/or websites including monitoring instructions to the public at large. Thus, it is expected that there will be many media devices accessing such apps and/or websites. Thus, it is expected that there will be many instances of the above processes conducted across many devices at the overlapping and/or distinct times. Thus, for example, there may be many instantiations of the machine-readable instructions disclosed in the below flowcharts operating at the same or different time. Some of these instances may be implemented as parallel threads operating on a same device.

Figure 2A:
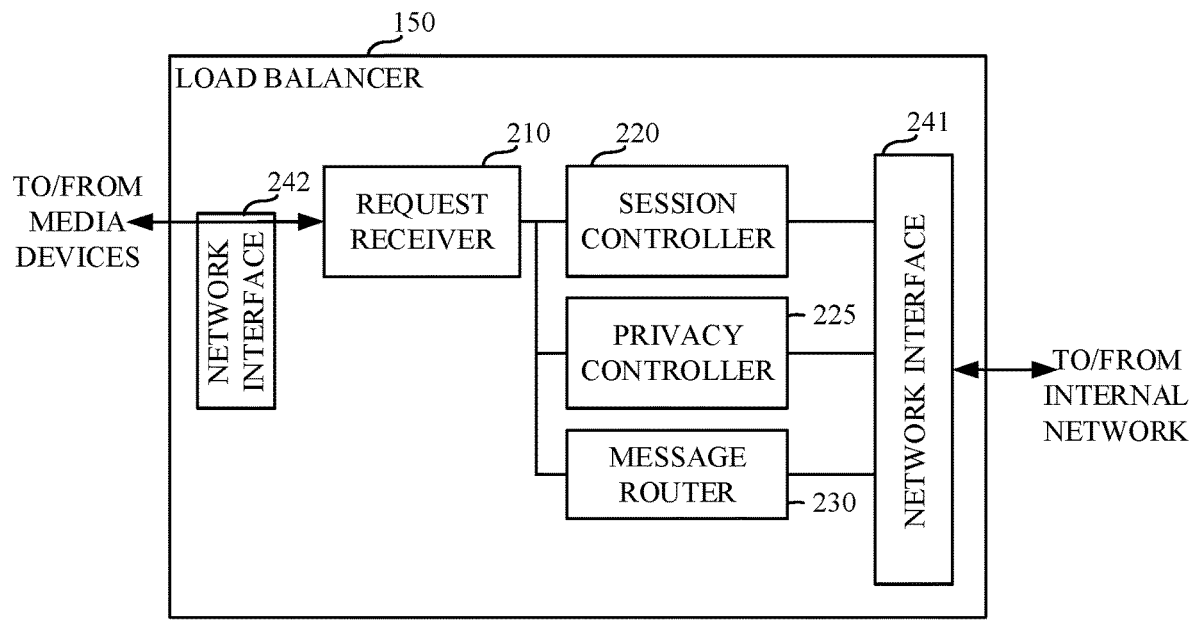
FIG. 2A depicts an example implementation of the example load balancer of the central facility of FIG. 1.

FIG. 2A depicts an example implementation of the example load balancer 150 of the example central facility 105 of FIG. 1. The example load balancer 150 of the illustrated example of FIG. 2A includes a request receiver 210, a session controller 220, a privacy controller 225, a message router 230, a first network interface 241, and a second network interface 242.

The example request receiver 210 of the illustrated example of FIG. 2A receives monitoring messages originating from the media device 130. In examples disclosed herein, the monitoring messages are received via the second network interface 242. In examples disclosed herein, the monitoring messages are hypertext transfer protocol (HTTP) messages. However, any other past, present, or future protocol(s) and/or type(s) of messages may be used to convey the monitoring information such as, for example, HTTP Secure (HTTPS), file transfer protocol (FTP), short message service (SMS). In examples disclosed herein, the monitoring messages are HTTP messages using a post method. However, any other HTTP method may additionally or alternatively be used such as, for example, an HTTP get method, an HTTP put method, an HTTP delete method, etc. When using the HTTP post method, monitoring information is sent in a payload of the monitoring message. The example request receiver 210 inspects the received message to identify a requested action of the monitoring message. In some examples, the monitoring message requests a new session ID, the monitoring message transmits monitoring information in association with an existing session, the monitoring message requests deletion of a current session.

The example session controller 220 of the illustrated example of FIG. 2A inspects received monitoring information and session ID information to create, update, and/or delete session information in the session database 160. Upon determining that a new session should be created, the example session controller 220 generates a session ID. In some examples, the session controller 220 updates a time of last activity of the session and/or validates a session time out against the time of last activity of the session to determine whether the session should be terminated and/or a new session should be created. An example session ID is disclosed in connection with FIG. 6.

The example privacy controller 225 of the illustrated example of FIG. 2A monitors incoming requests to create a session. The example privacy controller 225 compares application identifiers and/or device identifiers of incoming messages to privacy settings stored in the privacy settings database 170 to determine whether monitoring information should be collected. In some examples, the privacy controller 225 updates the privacy information stored in the privacy settings database 170 to ensure that the user's requested privacy settings are honored in the future.

While the media device 130 stores privacy settings 143 in the data store 140 of FIG. 1, in some examples, the privacy settings may inadvertently be cleared from the data store 140 (e.g., after an application is terminated, upon uninstallation of an application, etc.). If a user had previously opted out of being monitored while using an application, the user would likely be upset to find that they were later monitored as a result of un-installing and re-installing the application (thereby clearing the local settings). Honoring the requests of users to be or to not be monitored is important. Storing the privacy settings at the central facility 105 ensures that in the event of receipt of a monitoring message from an application and/or device that had previously opted-out, a responsive action can be taken to ensure that either the user is not monitored, or that the user is prompted to confirm whether they had intended to enable monitoring. In some examples, the responsive action involves instructing the media device 130 to present a privacy settings interface to clearly explain to the user their privacy settings.

The example message router 230 routes incoming monitoring information to an impression processor 162, 163, 164 based on the session identifier included in the incoming monitoring message. As noted above, the session identifier is created by the session controller 220 and communicated to the media device 130 such that the media device 130 includes the session identifier in subsequent monitoring messages. In examples disclosed herein, the example message router 230 extracts the session identifier included in the incoming monitoring information and routes the incoming monitoring message based on an impression processor ID included in the extracted session identifier. An example session identifier is shown in the illustrated example of FIG. 6.

Figure 6:
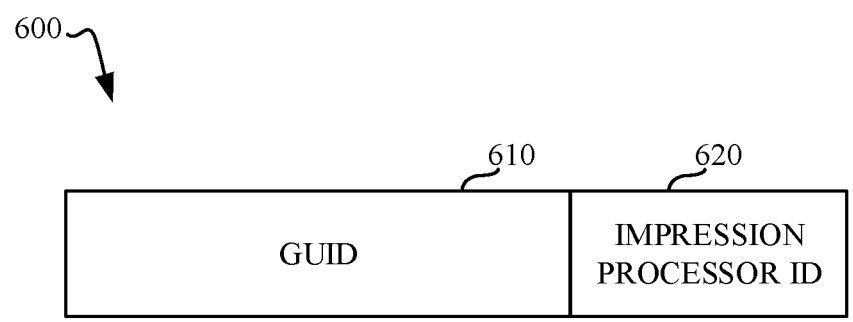
FIG. 6 depicts an example format of a session identifier generated by the load balancer of FIGS. 1 and/or 2A.

In the illustrated example of FIG. 6, an example session ID 600 includes a globally unique identifier (GUID) 610 and an impression processor ID 620. The GUID 610 identifies the session being created. In some examples, the GUID is unique to the impression processor identified by the impression processor ID 620. In some other examples, the GUID is unique across multiple impression processors (e.g., the impression processor 162, the impression processor 163, the impression processor 164, etc.). In examples disclosed herein, the GUID is an alphanumeric string of characters. However, any other format may additionally or alternatively be used such as, for example, a hexadecimal string, a decimal number, etc. The example impression processor ID 620 uniquely identifies the impression processor 162, 163, 164 to which the monitoring message carrying the session ID 600 should be routed. In examples disclosed herein, the impression processor ID 620 is appended to the GUID 610. However, the example impression processor ID 620 may be combined with the GUID 610 in any other fashion. In examples disclosed herein, the example impression processor ID 620 is a numeric identifier that identifies the originating server. However, any other approach to identifying the originating server may additionally or alternatively be used such as, for example, an Internet protocol (IP) address, a server name (e.g., a domain name system (DNS) name), etc.

Returning to FIG. 2A, the first network interface 241 and the second network interface 242 are implemented as wired Ethernet network interfaces. The first network interface 241 and the second network interface 242 facilitate communication to and/or from other elements of the central facility (e.g., the session database 160, the privacy settings database 170, the impression processor(s) 162, 163, 164, etc.) via the internal network 152, and/or facilitate communications with devices outside of the central facility 105 such as, for example, the media device 130 via the external network 120. However, any other approach to implementing the example first network interface 241 and/or the example second network interface 242 may additionally or alternatively be use used. While in the illustrated example of FIG. 2A the first example network interface 241 and the second example network interface 242 are illustrated as separate network interfaces, in some examples, the first example network interface 241 and the second example network interface 242 may be implemented by a same network interface.

Figure 2B:
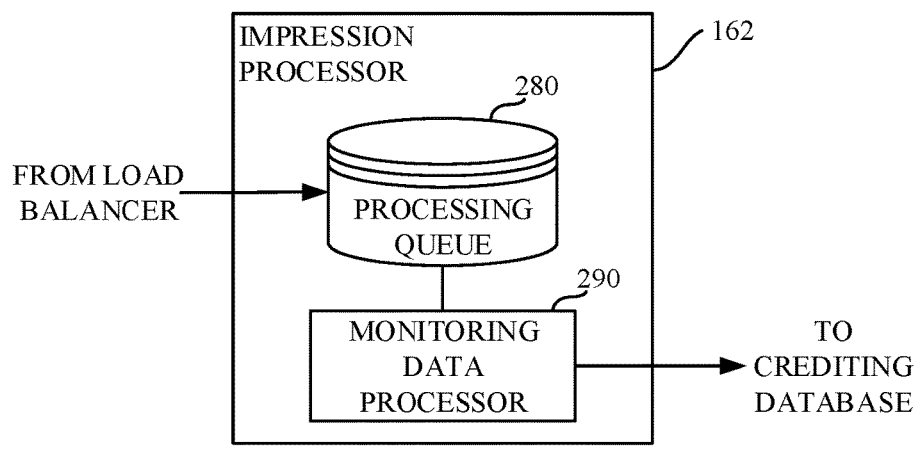
FIG. 2B depicts an example implementation of the example impression processor of the central facility of FIG. 1.

FIG. 2B depicts an example implementation of the example impression processor 162 of the example central facility 105 of FIG. 1. The example impression processor 162 includes a processing queue 280 and a monitoring data processor 290. The example processing queue 280 stores incoming monitoring messages that have been routed to the impression processor 162 by the message router 230 of the load balancer 150. In the illustrated example of FIG. 2B, the impression processor 162 includes a single processing queue 280. However, in some examples, multiple processing queues may additionally or alternatively be used.

The example processing queue 280 may be any device for storing data such as, for example, flash memory, magnetic media, optical media, etc. As noted above, the example processing queue 280 of the illustrated example of FIG. 2B stores monitoring messages including, for example, a payload, a session identifier, an application identifier, a device identifier, etc. However, the example processing queue 280 may additionally or alternatively store any other information. Furthermore, the data stored in the processing queue 280 may be in any data format such as, for example, binary data, comma delimited data, tab delimited data, structured query language (SQL) structures, etc. An example data table that may be stored in the processing queue 280 is described below in connection with FIG. 4. While in the illustrated example the processing queue 280 is illustrated as single database, the processing queue 280 may be implemented by multiple databases, and/or be stored in multiple memory locations of the central facility 105.

Figure 3:
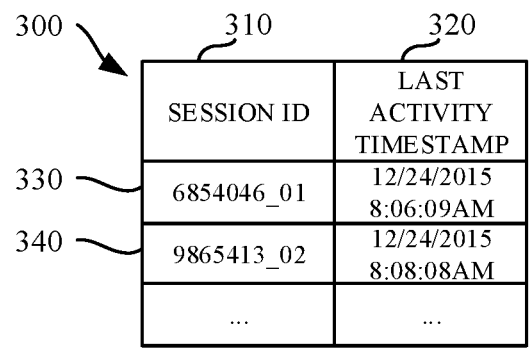
FIG. 3 is an example session data table representing session information that may be stored in the example session database of FIG. 1.

FIG. 3 is an example session data table 300 representing session information that may be stored in the example session database of FIG. 1. In the illustrated example of FIG. 3, the session data table includes a session ID column 310 and a last activity timestamp column 320. The example session ID column 310 identifies a session ID. The last activity timestamp column 320 identifies a time of last activity of the corresponding session ID represented by the session ID column 310. While in the illustrated example of FIG. 3 two columns are shown, any other columns representing any other data may additionally or alternatively be used.

In the illustrated example of FIG. 3, the example session data table 300 includes a first session row 330 and a second session row 340. Each of the session rows corresponds to a monitoring session of an application and/or device that is transmitting monitoring data to the central facility 105.

Figure 4:
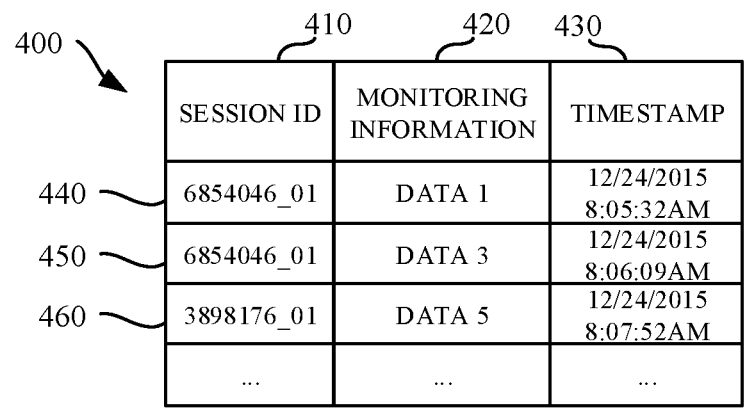
FIG. 4 is an example data table representing monitoring information that may be transmitted to the processing queue by the example load balancer of FIG. 1.

FIG. 4 is an example data table representing 400 monitoring information that may be transmitted to the processing queue by the example load balancer 150 of FIGS. 1 and/or 2A. The example data table 400 of the illustrated example of FIG. 4 includes a session ID column 410, a monitoring information column 420, and a timestamp column 430. The example session ID identifies the session with which the received monitoring information is associated. The example monitoring information column 420 includes a payload of monitoring information as received at the load balancer 150. In the illustrated example of FIG. 4, the monitoring data of the monitoring information column 420 may be text data, binary data, or any other format of data for conveying monitoring information. In examples disclosed herein, the monitoring data includes a signature and/or a code (and/or a digital representation of a code and/or a signature) to facilitate monitoring of streaming media.

The example data table 400 of FIG. 4 includes three example rows 440, 450, 460. The first example row 440 indicates a session ID of "6854046_01". The second example row 450 also indicates a session ID of "6854046_01," indicating that the first example row 440 and the second example row 450 correspond to a same session. The third example row 460 uses a session ID of "898176_01" and, accordingly, corresponds to a different session than the first example row 440 and the second example row 450.

Figure 5:
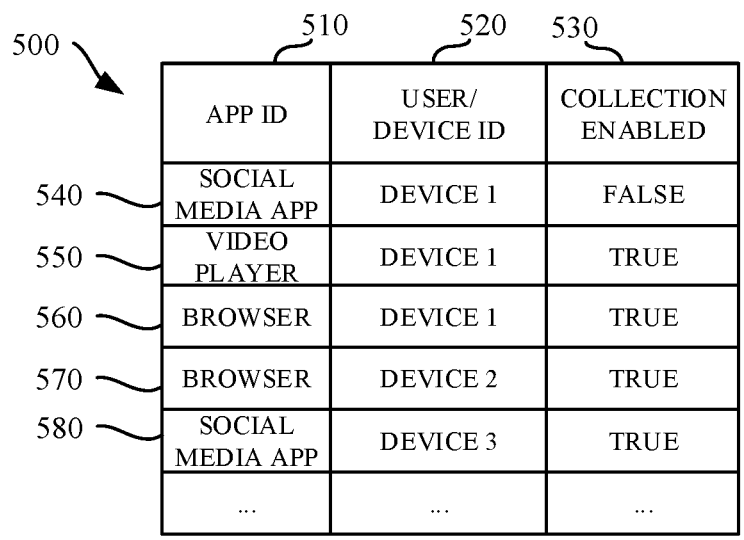
FIG. 5 is an example privacy settings data table representing privacy settings information that may be stored in the example privacy settings database of FIG. 1.

FIG. 5 is an example privacy settings data table 500 representing privacy settings information that may be stored in the example privacy settings database 170 of FIG. 1. The example privacy settings data table 500 includes an application ID column 510, a user/device ID column 520, and a collection enabled column 530. The example application ID column 510 identifies an application executed on a media device. In the illustrated example of FIG. 5, different applications are identified by a name of the application. However, any other approach to identifying an application (e.g., a version number, a serial number, an executable file location, etc.) may additionally or alternatively be used. The example user/device ID column 520 identifies a device on which the application is executed and/or, in some examples, a user of the device. In the illustrated example of FIG. 5, user/device identifier(s) include identifiers that can be used by the database proprietors 198 to identify the user or users of the media device 130, and/or to locate user information corresponding to the user(s). For example, the user/device/user ID may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), web storage data, document object model (DOM) storage data, local shared objects (also referred to as "Flash cookies"), etc. In some examples, fewer or more user/device ID(s) may be used.

Lastly, the collection enabled column 530 identifies whether collection of monitoring information is to be enabled for the corresponding application ID and device ID pair. In the illustrated example of FIG. 5, a binary indication (e.g., true, false) of whether monitoring information is to be collected is used. However, any other approach to identifying whether collection of monitoring information is enabled may additionally or alternatively be used. In some examples, the user/device ID column 520 may include user information, such that different users using the same device might have different privacy settings. The example privacy settings data table 500 of FIG. 5 includes five example rows 540, 550, 560, 570, 580 that identify an application, a device, and whether collection of monitoring information is enabled for that application and device pair.

FIG. 6 depicts an example format of a session identifier generated by the load balancer 150 of FIGS. 1 and/or 2A. In the illustrated example of FIG. 6, an example session ID 600 includes a globally unique identifier (GUID) 610 and an impression processor ID 620. The GUID 610 identifies the session being created. In some examples, the GUID is unique for the impression processor to which the session is allocated. In some other examples, the GUID is unique across multiple impression processor (e.g., the impression processor 162, the impression processor 163, the impression processor 164, etc.). In examples disclosed herein, the GUID is an alphanumeric string of characters. However, any other format may additionally or alternatively be used such as, for example, a hexadecimal string, a decimal number, etc. The example impression processor ID 620 uniquely identifies the impression processor that is to service monitoring information received in connection with the session. In examples disclosed herein, the impression processor ID 620 is appended to the GUID 610. However, the example impression processor ID 620 may be combined with the GUID 610 in any other fashion. In examples disclosed herein, the example impression processor ID 620 is a numeric identifier that identifies the originating server. However, any other approach to identifying the impression processor may additionally or alternatively be used such as, for example, an Internet protocol (IP) address, a server name (e.g., a domain name system (DNS) name), etc. Identifying the impression processor in the session ID enables more expedient routing of the monitoring information associated with the session.

Figure 7:
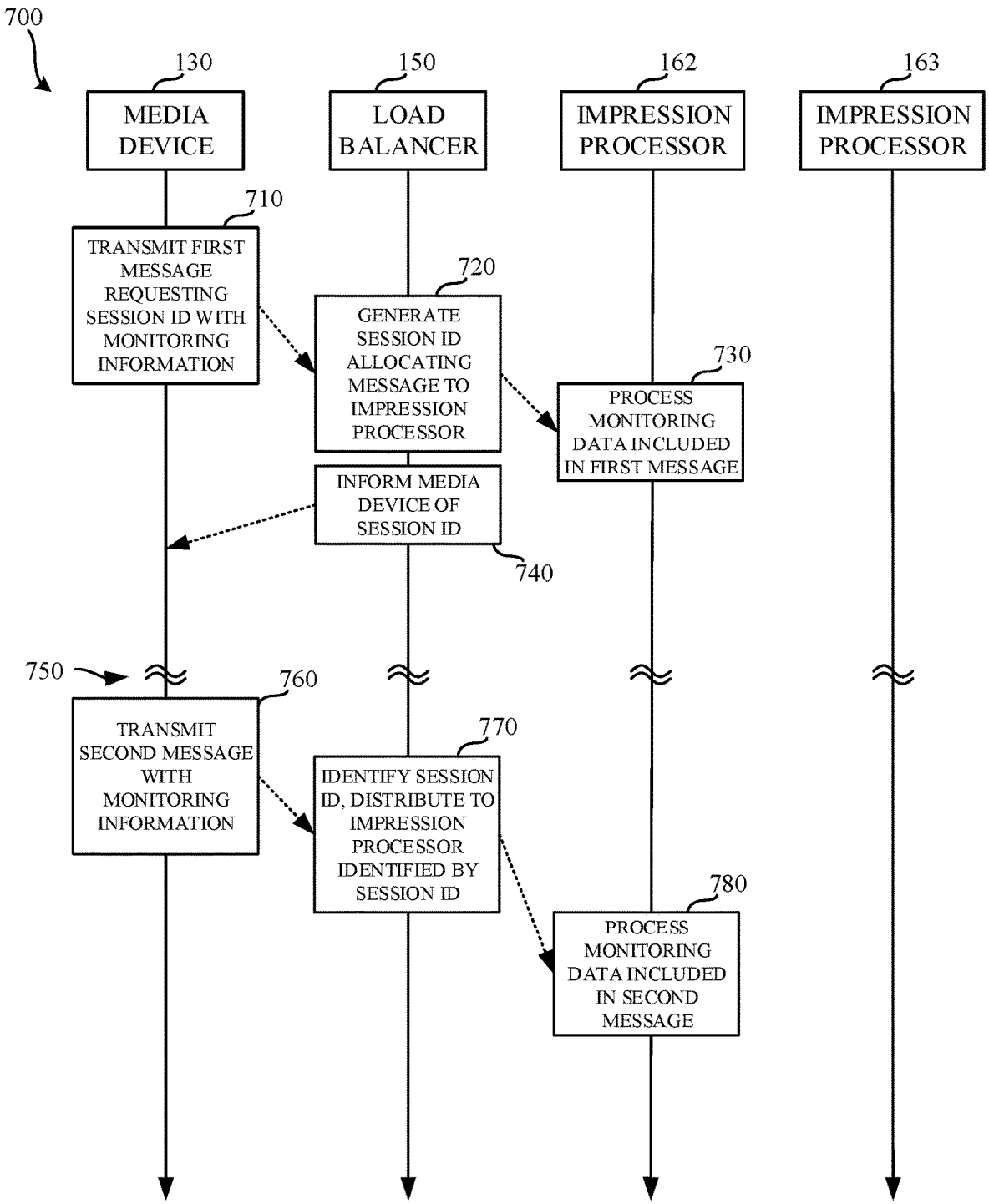
FIG. 7 depicts example communications that may occur between the media device, the load balancer, and the impression processor(s) of FIGS. 1, 2A, and/or 2B.

FIG. 7 depicts example communications that may occur between the media device 130, the load balancer 150, and the impression processor(s) 162, 163, 164 of FIGS. 1 and/or 2B. In the illustrated example of FIG. 7, the communication diagram 700 begins when the media device 130 transmits a first message requesting a session ID. (Block 710). In the illustrated example of FIG. 7, the first message includes monitoring information. However, in some examples, the first message may not include monitoring information and may instead be intended to request a session ID such that monitoring information can be transmitted in a subsequent message. The load balancer 150 receives the first message and generates a session ID allocating the message to an impression processor. (Block 720). As noted above, the load balancer 150 uses a round robin approach to distribute incoming messages to different impression processors 162, 163, 164. In the illustrated example of FIG. 7, the load balancer 150 determines that the first message should be delivered to the first impression processor 162. The first impression processor 162 receives the first message and, in response, processes the monitoring information included in the received message. (Block 730). The load balancer 150 informs the media device 130 of the session ID, such that subsequent messages can include the session ID, thereby enabling the monitoring information received from the media device 130 to be routed to the same impression processor for processing.

In the illustrated example of FIG. 7, some amount of time (e.g., seconds, minutes, hours, etc.) passes (750) until the media device 130 determines that additional monitoring information is ready to be sent. The media device transmits a second message including the monitoring information. (Block 760). The load balancer 150 receives the second message and determines a destination for the second message. (Block 770). In the illustrated example of FIG. 7, the example load balancer 150 identifies that the session ID indicates that the monitoring information should be allocated to the first impression processor 162. The first example impression processor then receives the second message and processes the monitoring data included therein (Block 780).

While an example manner of implementing the media device 130 is illustrated in FIG. 1, one or more of the elements, processes and/or devices illustrated in FIG. 1 may be combined, divided, re-arranged, omitted, eliminated and/or implemented in any other way. Further, the example monitoring instruction executor 135, the example data store 140, the example session memory 142, the example privacy settings 143, and/or more generally, the example media device 130 of FIG. 1 may be implemented by hardware, software, firmware and/or any combination of hardware, software and/or firmware. Thus, for example, any of the example monitoring instruction executor 135, the example data store 140, the example session memory 142, the example privacy settings 143, and/or more generally, the example media device 130 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example monitoring instruction executor 135, the example data store 140, the example session memory 142, the example privacy settings 143, and/or more generally, the example media device 130 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example media device 130 of FIG. 1 may include one or more elements, processes and/or devices in addition to, or instead of, those illustrated in FIG. 1, and/or may include more than one of any or all of the illustrated elements, processes and devices.

While an example manner of implementing the example central facility 105 of FIG. 1 is illustrated in FIGS. 1, 2A, and/or 2B, one or more of the elements, processes and/or devices illustrated in FIGS. 1, 2A, and/or 2B may be combined, divided, re-arranged, omitted, eliminated and/or implemented in any other way. Further, the example monitoring instruction provider 110, the example request receiver 210, the example session controller 220, the example privacy controller 225, the example message router 230, and/or, more generally, the example load balancer 150 of FIGS. 1 and/or 2A, the example internal network 152, the example session database 160, the example privacy settings database 170, the example processing queue 280, the example monitoring data processor 290, and/or, more generally, the example impression processor 162 of FIG. 2B, the example crediting database 190, the example report generator 195, and/or, more generally, the example central facility 105 of FIG. 1 may be implemented by hardware, software, firmware and/or any combination of hardware, software and/or firmware. Thus, for example, any of the example monitoring instruction provider 110, the example request receiver 210, the example session controller 220, the example privacy controller 225, the example message router 230, and/or, more generally, the example load balancer 150 of FIGS. 1 and/or 2A, the example internal network 152, the example session database 160, the example privacy settings database 170, the example processing queue 280, the example monitoring data processor 290, and/or, more generally, the example impression processor 162 of FIG. 2B, the example crediting database 190, the example report generator 195, and/or, more generally, the example central facility 105 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example monitoring instruction provider 110, the example request receiver 210, the example session controller 220, the example privacy controller 225, the example message router 230, and/or, more generally, the example load balancer 150 of FIGS. 1 and/or 2A, the example internal network 152, the example session database 160, the example privacy settings database 170, the example processing queue 280, the example monitoring data processor 290, and/or, more generally, the example impression processor 162 of FIG. 2B, the example crediting database 190, the example report generator 195, and/or, more generally, the example central facility 105 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 105 of FIG. 1 may include one or more elements, processes and/or devices in addition to, or instead of, those illustrated in FIGS. 1, 2A, and/or 2B, and/or may include more than one of any or all of the illustrated elements, processes and devices.

Figure 8:
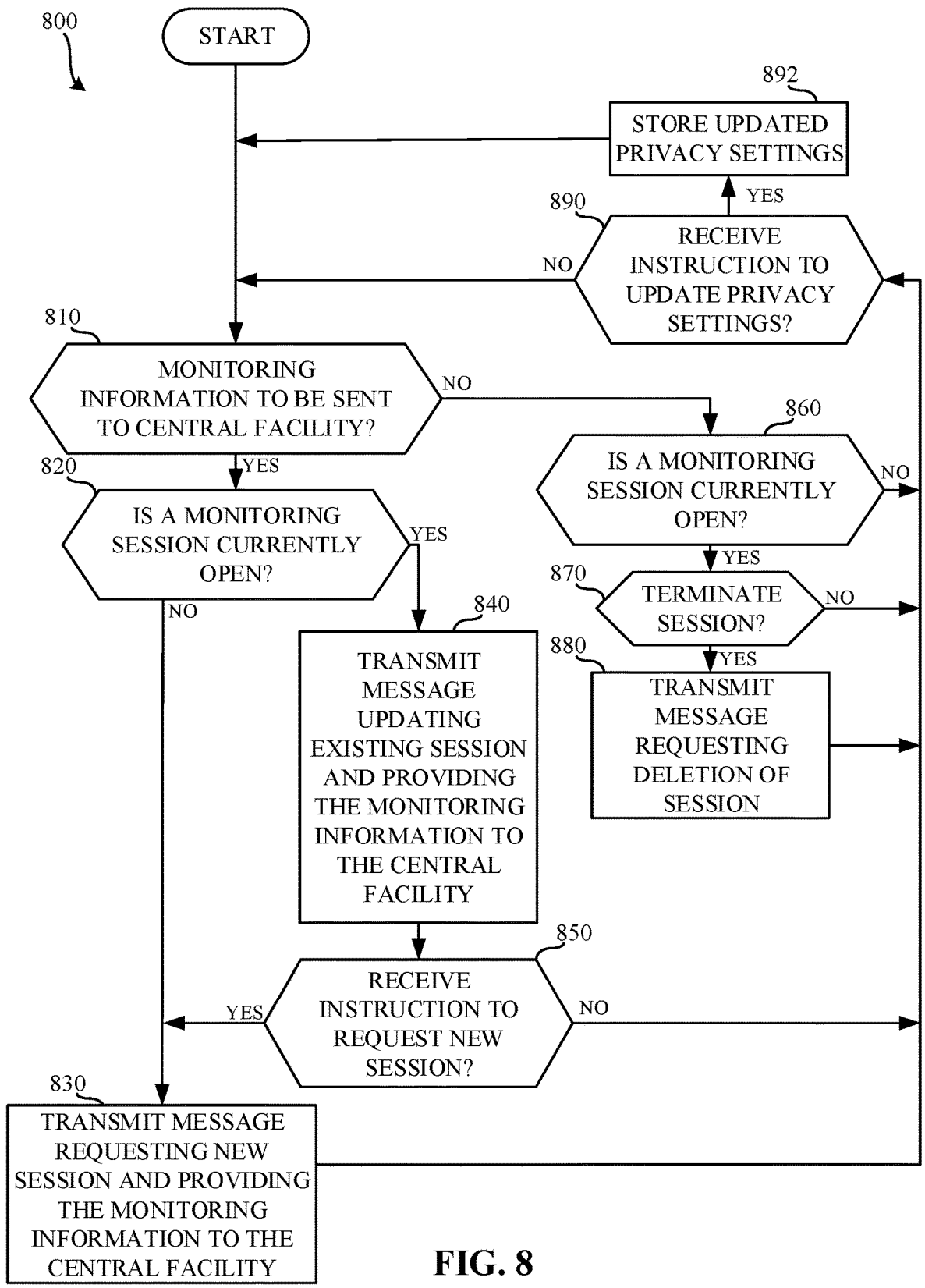
FIG. 8 is a flowchart representative of example machine readable instructions that may be executed to implement the example media device of FIG. 1 to report monitoring information to the example central facility of FIG. 1.
Figure 10:
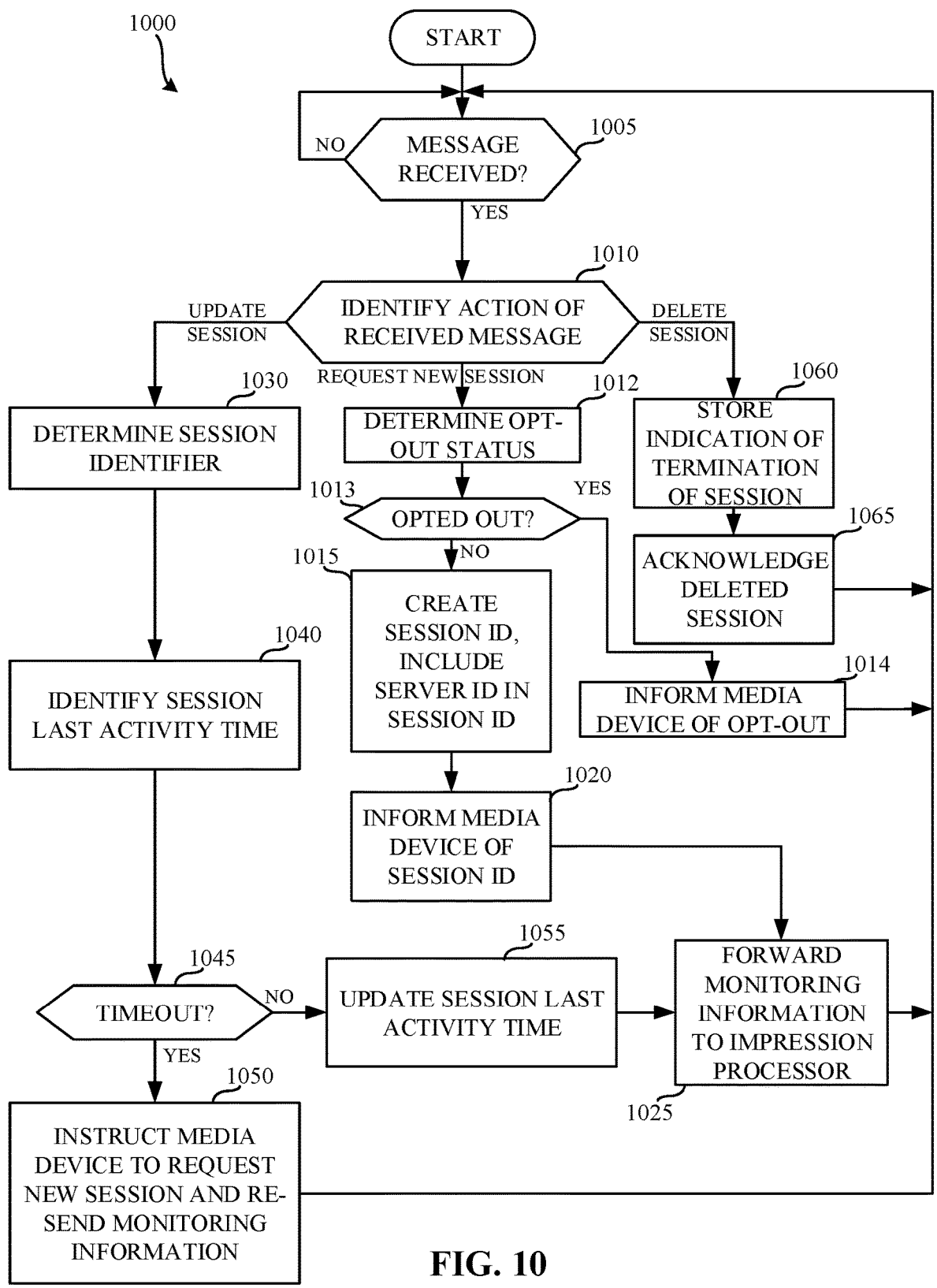
FIG. 10 is a flowchart representative of example machine readable instructions that may be executed to implement the example load balancer of FIGS. 1 and/or 2A to coordinate receipt of monitoring information from the media device of FIG. 1.
Figure 11:
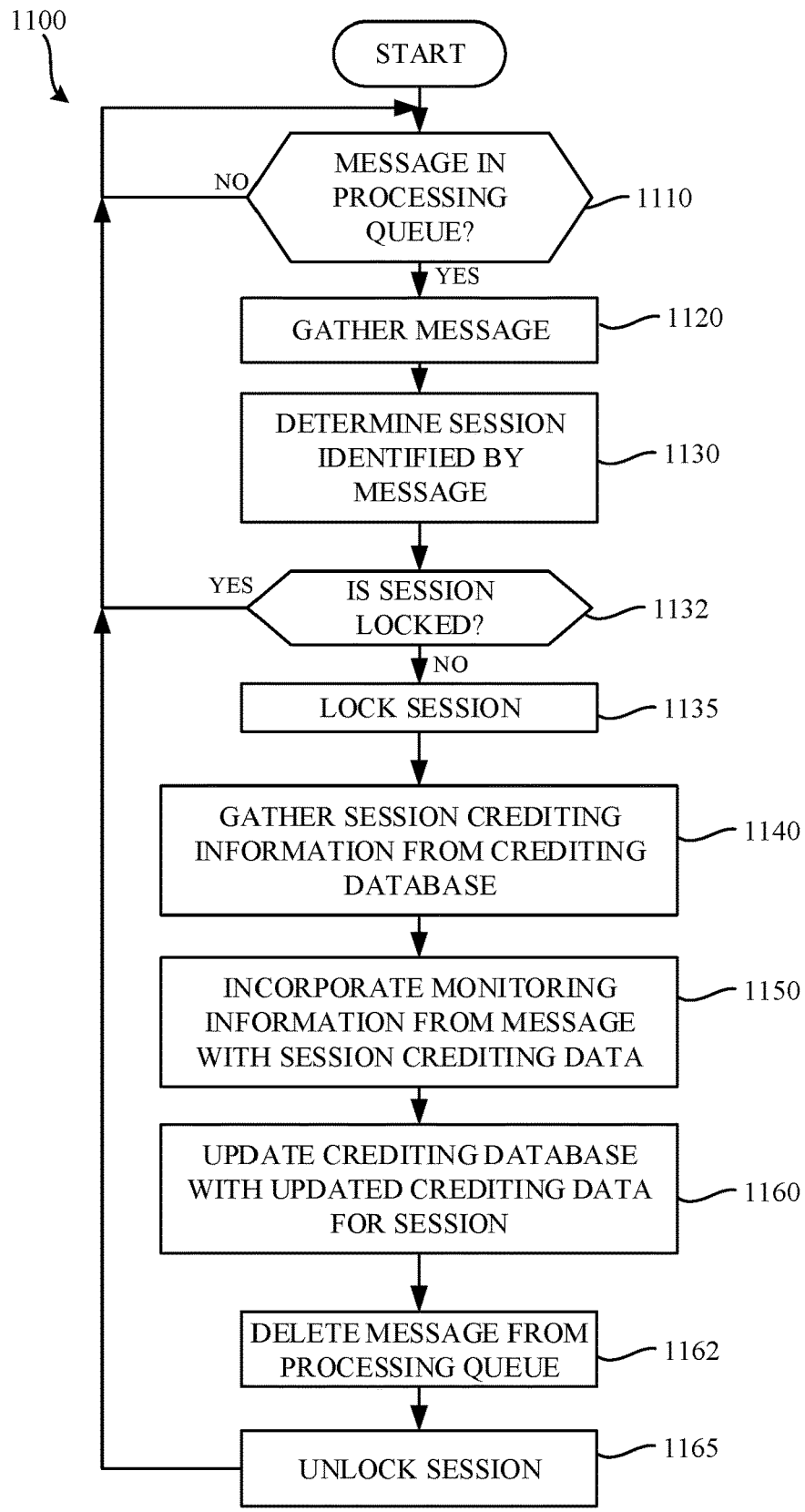
FIG. 11 is a flowchart representative of example machine readable instructions that may be executed to implement the example impression processor(s) of FIGS. 1 and/or 2B to process monitoring information.

Flowcharts representative of example machine readable instructions for implementing the example media device 130 of FIG. 1 are shown in FIGS. 8 and/or 9. Flowcharts representative of example machine readable instructions for implementing the example central facility 105 of FIG. 1 are shown in FIGS. 10, 11, and/or 12. In these examples, the machine readable instructions comprise a program for execution by a processor such as the processor 1312 shown in the example processor platform 1300 discussed below in connection with FIG. 13, and/or the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1312, 1412, but the entire program and/or parts thereof could alternatively be executed by a device other than the processor 1312, 1412 and/or embodied in firmware or dedicated hardware. Further, although the example program is described with reference to the flowcharts illustrated in FIGS. 8, 9, 10, 11, and/or 12, many other methods of implementing the example media device 130 and/or the example central facility 105 may alternatively be used. For example, the order of execution of the blocks may be changed, and/or some of the blocks described may be changed, eliminated, or combined.

As mentioned above, the example processes of FIGS. 8, 9, 10, 11, and/or 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8, 9, 10, 11, and/or 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 8 is a flowchart representative of example machine readable instructions that may be executed to implement the example media device 130 of FIG. 1. The example process 800 of the illustrated example of FIG. 8 begins when the example monitoring instruction executor 135 determines whether there is monitoring information to be sent to the central facility 105. (Block 810). In the illustrated example, the determination of whether there is monitoring information to be sent is implemented by detecting a media presentation from and/or in the proximity of the media device 130. However, in some examples, the detection of the monitoring information may be implemented by detecting user interaction with the media device 130, and/or may be made based on privacy settings stored in the data store 140. In the illustrated example of FIG. 8, the determination of whether there is monitoring information to be sent to the central facility 105 is performed in response to detection of the media presentation. However, in some examples, monitoring information may first be cached, and a determination may be made as to whether a threshold amount of information exists to be sent (e.g., send monitoring information when it is determined that there is one hundred kilobytes of monitoring information to be sent) and/or whether the information has reached a threshold age (e.g., do not delay longer than one hour when caching data monitoring information to be sent.) In examples disclosed herein, the determination of whether monitoring information is to be sent to the central facility 105 is based on privacy settings 143 stored in the data store 140.

If monitoring information is to be sent to the central facility 105 (Block 810 returns a result of YES), the example monitoring instruction executor 135 determines whether a monitoring session is currently open with the central facility 105. (Block 820). In examples disclosed herein, whether the monitoring session is currently open with the central facility 105 is determined by inspecting the session memory 142 to determine whether a session ID is present. However, in some examples, the example monitoring instruction executor 135 compares a time of last activity of the identified session ID (e.g., a time that a last message was transmitted to the central facility 105) to determine whether a threshold amount of time has passed (e.g., five minutes, thirty minutes, etc.). If the monitoring session is not currently open (Block 820 returns a result of NO), the example monitoring instruction executor 135 transmits a message requesting a new session ID and providing the monitoring information to the central facility 105. (Block 830). Control then proceeds to block 890, where the media device 130 determines whether an instruction to update privacy settings has been received.

If a monitoring session is open (Block 820 returns a result of YES,) the example monitoring instruction executor 135 transmits a message updating the existing session and providing the monitoring information to the central facility 105. (Block 840). In response to the message updating the existing session, the central facility 105 may transmit an instruction to request a new session. The example monitoring instruction executor 135 determines whether the instruction to request the new session has been received. (Block 850). If the request has been received (Block 850 returns a result of YES), the example monitoring instruction executor 135 transmits a message requesting a new session and providing the monitoring information to the central facility 105. (Block 830). In examples disclosed herein, the monitoring information is re-transmitted (e.g., the monitoring information is first transmitted in block 840 and then re-transmitted in block 830). However, in some examples, the monitoring information may not be re-transmitted. In some examples, instead of instructing the example monitoring instruction executor 135 to re-transmit monitoring information, the example central facility 105 may create a new session ID to be used and instruct the example monitoring instruction executor 135 to use that new session ID in subsequent communications. Returning to block 850, if no instruction to request a new session is received, control proceeds to block 890, where the media device 130 determines whether an instruction to update privacy settings has been received.

Returning to block 810, in some examples, there may be no monitoring information to be transmitted to the central facility 105. In the illustrated example of FIG. 8, the example monitoring instruction executor 135 determines that no monitoring information is to be transmitted by determining whether media is currently being presented by and/or within proximity of the media device 130. However, any other approach to determining whether monitoring information exists to be sent may additionally or alternatively be used such as, for example, inspecting a cache (e.g. the data store 140) to determine whether any monitoring information has been cached for transmission to the central facility 105. Moreover, in some examples, the example monitoring instruction executor 135 may determine that that no monitoring information is to be sent by determining that the user has closed an application (e.g., a browser, an "app") on the mobile device 130, etc.

If the example monitoring instruction executor 135 determines that no monitoring information is to be sent to the central facility (Block 810 returns a result of NO), the example monitoring instruction executor 135 determines whether a monitoring session is currently open. (Block 860). In examples disclosed herein, whether the monitoring session is currently open with the central facility 105 is determined by inspecting the session memory 142 to determine whether a session ID is present. However, in some examples, the example monitoring instruction executor 135 compares a time of last activity of the identified session ID (e.g., a time that a last message was transmitted to the central facility 105) to determine whether a threshold amount of time has passed (e.g., five minutes, thirty minutes, etc.). If the monitoring session is not currently open (Block 860 returns a result of NO), control returns to block 890, where the media device 130 determines whether an instruction to update privacy settings has been received.

If a monitoring session is open (Block 860 returns a result of YES), the example monitoring instruction executor 135 determines whether the monitoring session should be terminated. (Block 870). In examples disclosed herein, the example monitoring instruction executor 135 determines whether the monitoring session should be terminated based on a threshold amount of time having passed since a last user interaction with the media device 130. However, any other approach to determining whether the session should be terminated may additionally or alternatively be used such as, for example, determining whether an application (e.g., a browser, an "app") has been closed on the media device 130. If the session is not to be terminated (Block 870 returns a result of NO), control returns to block 810, where the example monitoring instruction executor 135 waits for monitoring information to send to the central facility 105. If the session is to be terminated (Block 870 returns a result of YES), the example monitoring instruction executor 135 transmits a message requesting deletion of the session. (Block 880). Transmitting the message requesting deletion of the session is useful because it enables the central facility 105 to record a time at which the session was positively terminated (e.g., an app was closed), instead of waiting for a session to time out (e.g., an assumption that the session should be terminated). Control then proceeds to block 890, where the media device 130 determines whether an instruction to update privacy settings has been received.

In some examples, the media device 130 may have determined that monitoring information was to be sent to the central facility based on an incorrect privacy setting. For example, if an application had been uninstalled, the privacy setting may have been removed. Users may expect that, upon subsequent re-installation of the application, their previously stored privacy settings are still honored. Such privacy settings are also stored at the central facility 105 and, in some examples, are conveyed to the media device 130 to allow subsequent honoring of those privacy settings. The example media device 130 determines whether an instruction to update the privacy settings 143 has been received (Block 890). If an instruction to update the privacy settings has not been received (Block 890 returns a result of NO), control proceeds to block 810 where the process 800 of FIG. 8 is repeated. If an instruction to update the privacy settings 143 has been received (Block 890 returns a result of YES), the media device stores the updated privacy setting 143 in the data store 140. (Block 892). Control then proceeds to block 810 where the process 800 of FIG. 8 is repeated.

Figure 9:
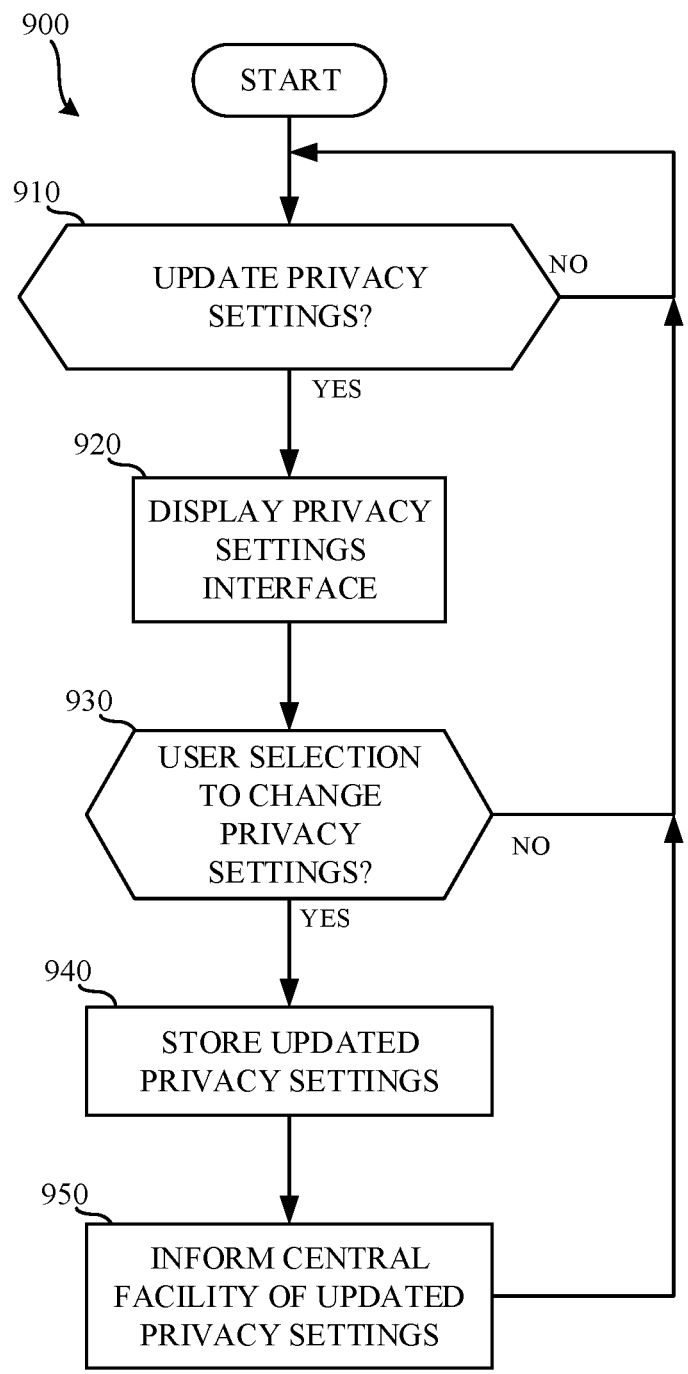
FIG. 9 is a flowchart representative of example machine readable instructions that may be executed to implement the example media device of FIG. 1 to control privacy settings.

FIG. 9 is a flowchart representative of example machine readable instructions that may be executed to implement the example media device of FIG. 1 to control privacy settings. In examples disclosed herein, the media device determines whether to update privacy settings (Block 910). Privacy settings may be updated in response to, for example, a user selecting a button to cause a privacy settings interface to be displayed, an instruction to update privacy settings received from the central facility 105, etc. If the privacy settings 143 are not to be updated (Block 910 returns a result of NO), control proceeds to block 910, where the process 900 of FIG. 9 is repeated.

If the privacy settings 143 are to be updated (Block 910 returns a result of YES), the media device displays a privacy settings interface. (Block 920). In examples disclosed herein, the privacy settings interface is implemented by a web page displayed by the media device. However, the privacy settings interface may be implemented in any other fashion (e.g., a prompt, a popup, etc.). The privacy settings interface, in some examples, enables the user to change their privacy settings. If the user has made a selection to change their privacy settings (Block 930 returns a result of YES), the media device 130 stores the updated privacy settings 143 in the data store 140. (Block 940). In the illustrated example of FIG. 9, the media device 130 informs the central facility 105 of the updated privacy settings. (Block 950). If the user has not made a selection to change their privacy settings (Block 930 returns a result of NO), control proceeds to block 910, where the process 900 of FIG. 9 is repeated.

FIG. 10 is a flowchart representative of example machine readable instructions 1000 that may be executed to implement the example load balancer 150 of FIGS. 1 and/or 2A to coordinate receipt of monitoring information from the media device 130 of FIG. 1. The example process 1000 of FIG. 10 begins when the example request receiver 210 determines that a monitoring message has been received. (Block 1005). In examples disclosed herein, the example monitoring message originates from the media device 130. However, the example monitoring message may be received in any other fashion. If the example request receiver 210 identifies that no message has been received (Block 1005 returns a result of NO), the example request receiver 210 continues to monitor for the monitoring message. (Block 1005).

Upon receipt of the message (Block 1005 returns a result of YES), the example request receiver 210 inspects the received message to identify an action to be performed in response to the message. (Block 1010). The media device 130 may request a new session (see Block 830 of FIG. 8). If the example request receiver 210 identifies that the monitoring message requests a new session ID (Block 1010 returns a result of REQUEST NEW SESSION), the example privacy controller 225 extracts an application ID and/or a device ID included in the request for the new session and uses the application ID and/or the device ID to determine an opt-out status of the application and/or device pair. (Block 1012). As noted above, storing an opt-out status of the application and/or device pair ensures that settings that are lost at the media device 130 (e.g., due to an uninstallation and/or re-installation of an application) continue to be honored. An example privacy data table 600 is shown in the illustrated example of FIG. 6. If the application and/or device pair is opted out (e.g., permissions are configured in a way such as to disable collection of monitoring information) (Block 1013 returns a result of YES), the privacy controller 225 informs the media device 130 of the opt-out. (Block 1014). Informing the media device of the opt-out enables the media device 130 to more quickly determine that monitoring information is not to be sent to the central facility 105 (see block 810 of FIG. 8). Moreover, in the event that permissions are configured to disallow collection of monitoring information, any monitoring information received via the request for the new session is deleted. That is, the monitoring information received via the request for the new session is not used for any monitoring purposes to ensure compliance with the user preference of not being monitored.

If the application and/or device pair is opted in (e.g., permissions are configured in a way such as to enable collection of monitoring information) (Block 1013 returns a result of NO), the example session controller 230 creates a session ID for the media device 130. (Block 1015). In examples disclosed herein, the example session controller 220 creates a session ID including an identifier of the impression processor 162, 163, 164 to which the session will be allocated (e.g., the impression processor ID 620 of FIG. 6). In examples disclosed herein, the impression processor 162, 163, 164 is selected by the session controller 220 using, for example, a round robin load balancing algorithm. In examples disclosed herein, the session controller 220 stores the session ID and a time of receipt of the monitoring message in the session database 160. Storing the time of receipt of the monitoring message enables later determinations of whether a threshold amount of time has passed since a previous monitoring message. The session controller 220 transmits a response via the request receiver 210 to inform the media device of the session ID. (Block 1020). In some examples, the session ID is communicated to the media device 130 via an instruction to store a cookie. However, any other approach to informing the media device 130 of the session ID may additionally or alternatively be used.

The example message router 230 forwards the monitoring information to the impression processor with which the session is associated (e.g., as identified by the impression processor ID portion of the session ID). (Block 1025). In some examples, the monitoring information is included as a payload of the message. In such an example, the example message router 230 first extracts the payload of the message and forwards the payload on to the impression processor. Control then proceeds to block 1005, where the request receiver 210 waits for a subsequent monitoring message.

Returning to block 1010, in some examples, the monitoring message may correspond to a session that had previously been created. In some examples, the example request receiver 210 identifies that a session is to be updated with received monitoring information by detecting the presence of a session ID in the monitoring message. In some other examples, the example request receiver 210 identifies that the session is to be updated based on a separate instruction included in the received monitoring message. Upon determining that the session should be updated (e.g., block 1010 returns a result of UPDATE SESSION), the example session controller 220 inspects the monitoring message to determine the session ID. (Block 1030). The example session controller 220 identifies the impression processor to which the session has been allocated. In examples disclosed herein, the example session controller 220 identifies the impression processor by parsing the session ID. For example, an impression processor ID of "01" can be identified from the session ID of "6854046_01." In some examples, regular expressions are used to extract the impression processor ID from the session ID.

Using the session ID, the session controller 220 identifies a last time of activity for the session. (Block 1040). In the illustrated example of FIG. 10, the time of last activity for the session is queried from the session database 160. The session controller 220 inspects the time of last activity of the session ID to determine whether there has been a timeout. (Block 1045). A timeout is detected when a difference between the time of last activity of the session ID and a time of receipt of the monitoring message is greater than a threshold duration (e.g., five minutes, ten minutes, thirty minutes, etc.). If a timeout is detected (e.g., the difference exceeds the threshold resulting in block 1045 returning a result of YES), the example session controller 220, via the request receiver 210, instructs the media device to request a new session and re-transmit the monitoring information. (Block 1050). Control then proceeds to block 1005, where the request receiver 210 awaits a subsequent monitoring message. However, in some examples, instead of requesting re-transmission of the monitoring information (Block 1050), control may proceed to block 1015, where a new session is initialized (Block 1015), the media device is informed of the new session (Block 1020), and the monitoring information is forwarded to the impression processor (Block 1025).

Returning to block 1045, if no timeout is detected (e.g., the difference does not exceed the threshold resulting in block 1045 returning a result of NO), the session controller 220 updates the time of last activity to the time at which the monitoring message was received for the session ID. (Block 1055). Updating the time of last activity ensures that sessions are kept alive as long as they are being used. The example message router then forwards the received monitoring information to the impression processor based on the impression processor ID of the session ID. (Block 1025). In examples disclosed herein, the monitoring information is stored in the processing queue 280 of the identified impression processor 162, 163, 164 for subsequent processing by the monitoring data processor 290. Control then proceeds to block 1005, where the request receiver 210 waits for a subsequent monitoring message.

Returning to block 1010, in some examples, the media device 130 may identify that the session should be terminated (see blocks 870 and 880 of FIG. 8). For example, the media device 130 may determine that the session should be terminated upon detecting that an application (e.g., a browser, an "app") has been closed on the media device 130. Upon determining that the session should be deleted (e.g., block 1010 returns a result of DELETE SESSION), the example session controller 220 stores an indication of the termination of the session. (Block 1060). In examples disclosed herein, the record indicating the termination of the session is stored in the session database 160. Storing the record indicating the termination of the session ensures proper crediting of, for example, how long a user was actively using the media device 130. In some examples, in addition to storing the indication of the termination of the session in the session database 160, the example session controller 220 removes the session ID and last activity timestamp corresponding to the deleted session from the session database 160. The example session controller 220 then acknowledges the deletion of the session via the request receiver 210 to the media device 130. (Block 1065). Control then proceeds to block 1005, where the request receiver 210 waits for a subsequent monitoring message.

FIG. 11 is a flowchart representative of example machine readable instructions 1100 that may be executed to implement the example impression processor(s) 162, 163, 164 of FIGS. 1 and/or 2B to process monitoring information. The example process 1100 of FIG. 11 begins when the example monitoring data processor 290 inspects the processing queue 280 to determine whether a message has been received. (Block 1110). If no message exists in the processing queue 280 (e.g., no unprocessed messages have been routed to the impression processor 162, 163, 164, resulting in Block 1110 returning a result of NO), control proceeds to block 1110 where the example monitoring data processor 290 awaits a subsequent message. (Block 1110).

If a message is identified (Block 1110 returns a result of YES), the example monitoring data processor 290 gathers the message from the processing queue 280 (Block 1120). The example monitoring data processor 290 determines a session identified by the message (e.g., using the session ID) (Block 1130). In examples disclosed herein, the session ID is included in a header of the monitoring information message. However, in some examples, the session ID may be included in a payload of the monitoring information message (e.g., along with the media-identifying information).

In some examples, the impression processor 162, 163, 164 may implement multiple monitoring data processors 290. In such an example, each of the monitoring data processors may operate on the same processing queue 280. To avoid multiple monitoring data processors operating on a same session simultaneously, the monitoring data processor 290 may place a lock on the session. Locking the session ensures that other monitoring data processors (if any) of the impression processor do not attempt to credit a session simultaneously, which could result in incorrect crediting. In examples disclosed herein, the lock is stored in the session database 160. However, the lock may be stored in any other location (e.g., in a table of the processing queue 280, etc.). The monitoring data processor 290 inspects the session database 160 to determine if the identified session is locked. (Block 1132). If the session is locked (Block 1132 returns a result of YES), the message is not processed, and the monitoring data processor 290 checks the processing queue for another message. (Block 1110).

If the session is not locked (Block 1132 returns a result of NO), the example monitoring data processor 290 locks the session (Block 1135). In examples disclosed herein, the lock is implemented by an identifier stored in the session database 160. However, the lock may be implemented in any other fashion.

The example monitoring data processor 290 gathers session crediting information from the crediting database 190. (Block 1140). In examples disclosed herein, the session crediting information identifies media presented during the session and duration(s) of the media presented during the session. The monitoring data processor 290 incorporates the monitoring information included in the monitoring message into the session crediting data. (Block 1150). In examples disclosed herein, incorporating the monitoring information includes accumulating a duration of presentation for identified in the monitoring message with an already credited duration in the session crediting information (e.g., as identified in previously processed monitoring messages). In examples disclosed herein, incorporating the monitoring information includes identifying the media monitored in association with the monitoring message. Identifying the media may include, for example, extracting media-identifying metadata, codes, signatures, watermarks, and/or other information that may be used to identify presented media from the monitoring message. In some examples, activities and/or properties other than media presentations are monitored such as, for example, application usage, device information, etc.

The example monitoring data processor updates the crediting database with the updated crediting data for the session. (Block 1160). Updating the crediting database with the updated crediting information ensures that when subsequent messages are picked up from the processing queue, that the monitoring information is properly added to the session (e.g., no monitoring messages are missed and/or not considered.) The example monitoring data processor 290 then deletes the message from the processing queue 280 to ensure that the monitoring information included in the message is not double counted. (Block 1162). The monitoring data processor 290 then unlocks the session. (Block 1165). Unlocking the session enables other messages identifying the session to be processed. Control then proceeds to block 1110 where the monitoring data processor 290 repeats the process 1100 of FIG. 11 to continually monitor and process messages arriving in the processing queue 280.

Figure 12:
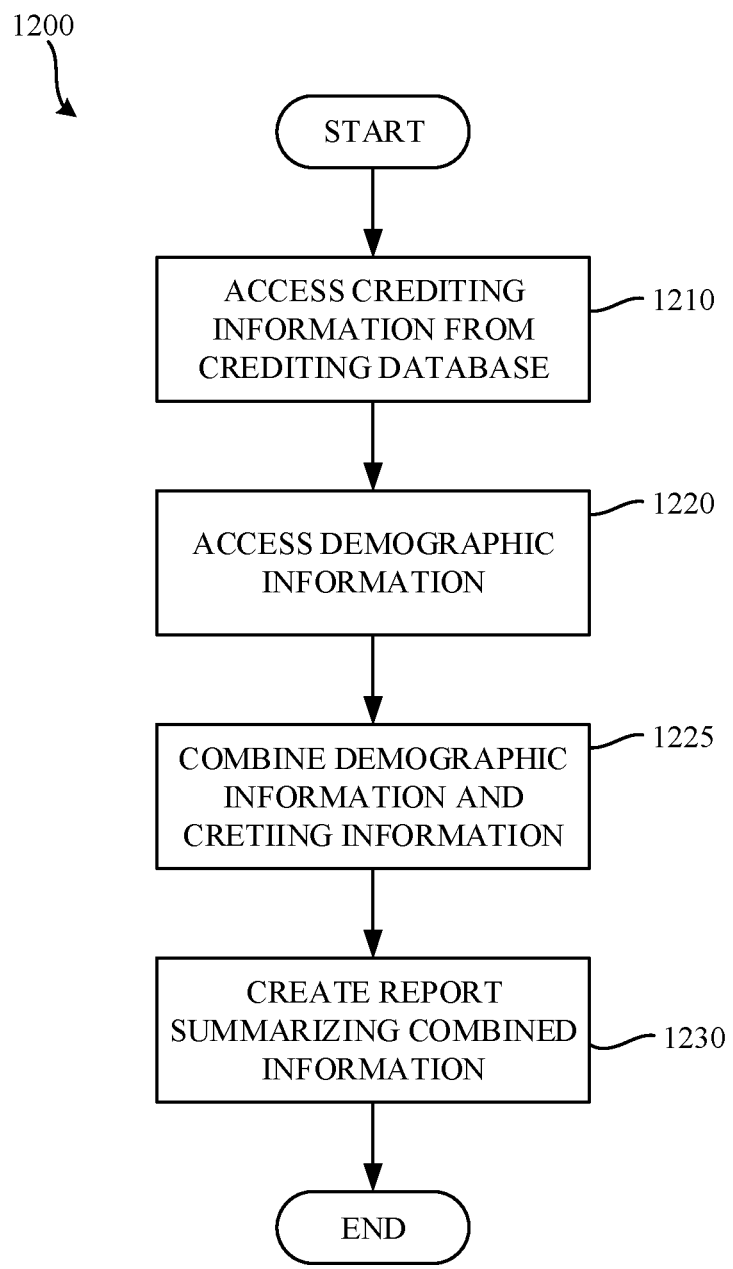
FIG. 12 is a flowchart representative of example machine readable instructions that may be executed to implement the example central facility of FIG. 1 to prepare a report summarizing the processed monitoring information created by the impression processor(s) of FIGS. 1 and/or 2B.

FIG. 12 is a flowchart representative of example machine readable instructions 1200 that may be executed to implement the example central facility 105 of FIG. 1 to aggregate crediting information collected by the impression processor(s) of FIG. 1. The example process 1200 of FIG. 12 begins when the example report generator 195 accesses credited sessions stored in the crediting database 190. (Block 1210). In examples disclosed herein, the crediting information is accessed periodically (e.g., once a day, every hour, etc.) to ensure that reports summarizing the crediting information are up to date. However, in some examples, the crediting information is accessed a-periodically (e.g., upon receipt of a request for a report, when a threshold amount of data stored in the crediting database 190 is detected, etc.).

The example report generator 195 accesses demographic information by, for example, querying the database proprietor with user identifiers identified in the crediting information. (Block 1220). Using demographic information provided by a database proprietor enables demographic information to be associated with media presentations of the media devices that report monitoring information. The example report generator 195 combines the demographic information with the crediting information. (Block 1225). Combining the demographic information and the crediting information enables reporting of demographic information in connection with various media (e.g., how many viewers of a first demographic were presented first media as compared to viewers of a second demographic.)

The example report generator 195 then generates a report summarizing the combined information. (Block 1230). In examples disclosed herein, the report summarizes media exposure information. However, any other type(s) of report(s) may additionally or alternatively be generated. For example, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the media device(s). Additionally or alternatively, the report may associate the media exposure metrics with indicators of the popularity of the artist, genre, song, title, etc., across one or more user characteristics selected from one or more demographic segment(s), one or more age group(s), one or more gender(s), and/or any other user characteristic(s).

Figure 13:
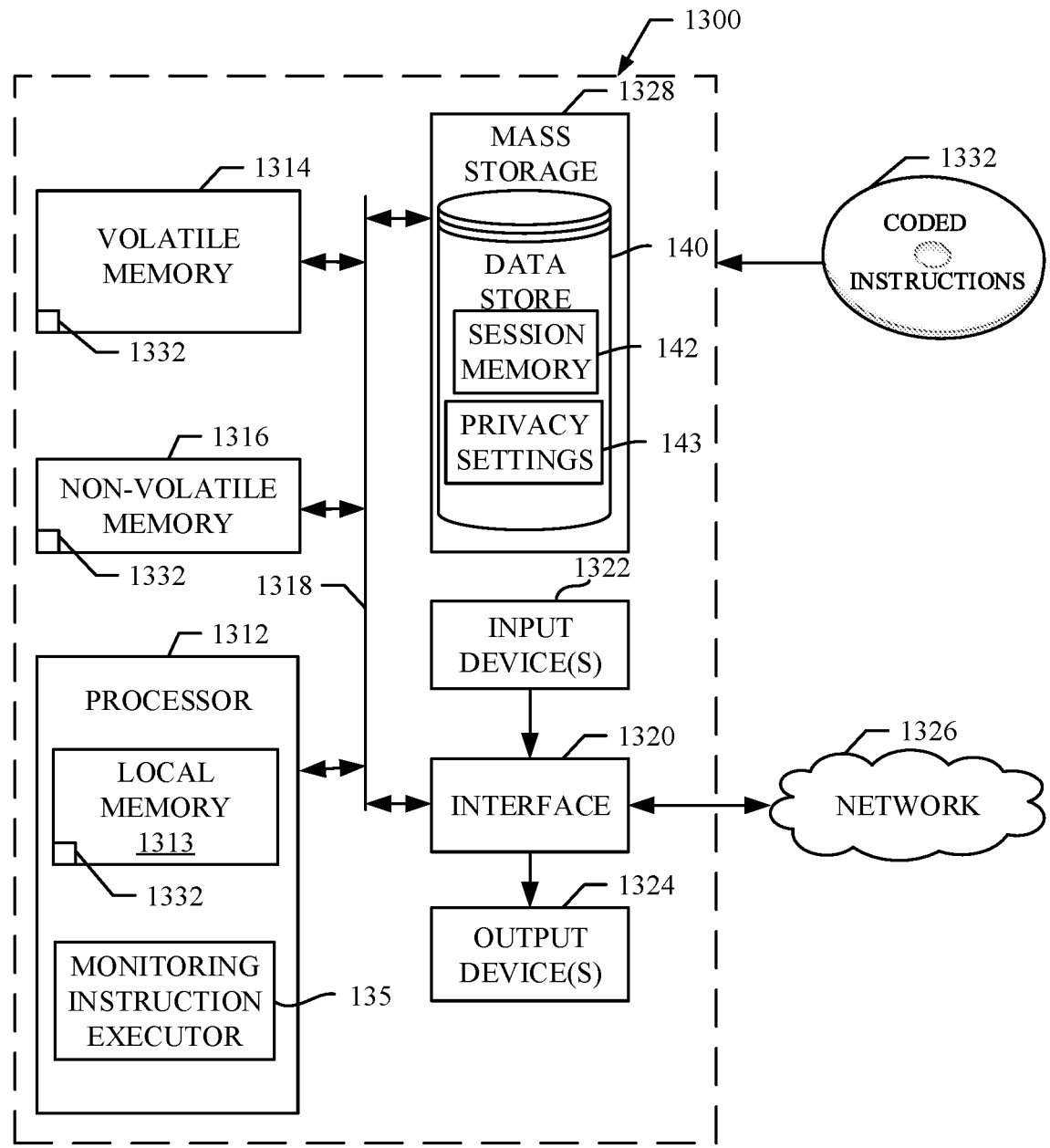
FIG. 13 is a block diagram of an example processor platform structured to execute the example machine readable instructions of FIGS. 8 and/or 9 to implement the example media device of FIG. 1.

FIG. 13 is a block diagram of an example processor platform 1300 capable of executing the instructions of FIGS. 8 and/or 9 to implement the example media device 130 of FIG. 1. The processor platform 1300 can be, for example, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache), and executes instructions to implement the example monitoring instruction executor 135 of FIG. 1. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 8 and/or 9 may be stored in the mass storage device 1328, in the volatile memory 1314, in the non-volatile memory 1316, and/or on a removable tangible computer readable storage medium such as a CD or DVD. In examples disclosed herein, the mass storage device implements the example data store 140, which stores the session memory 142 and/or the privacy settings 143.

Figure 14:
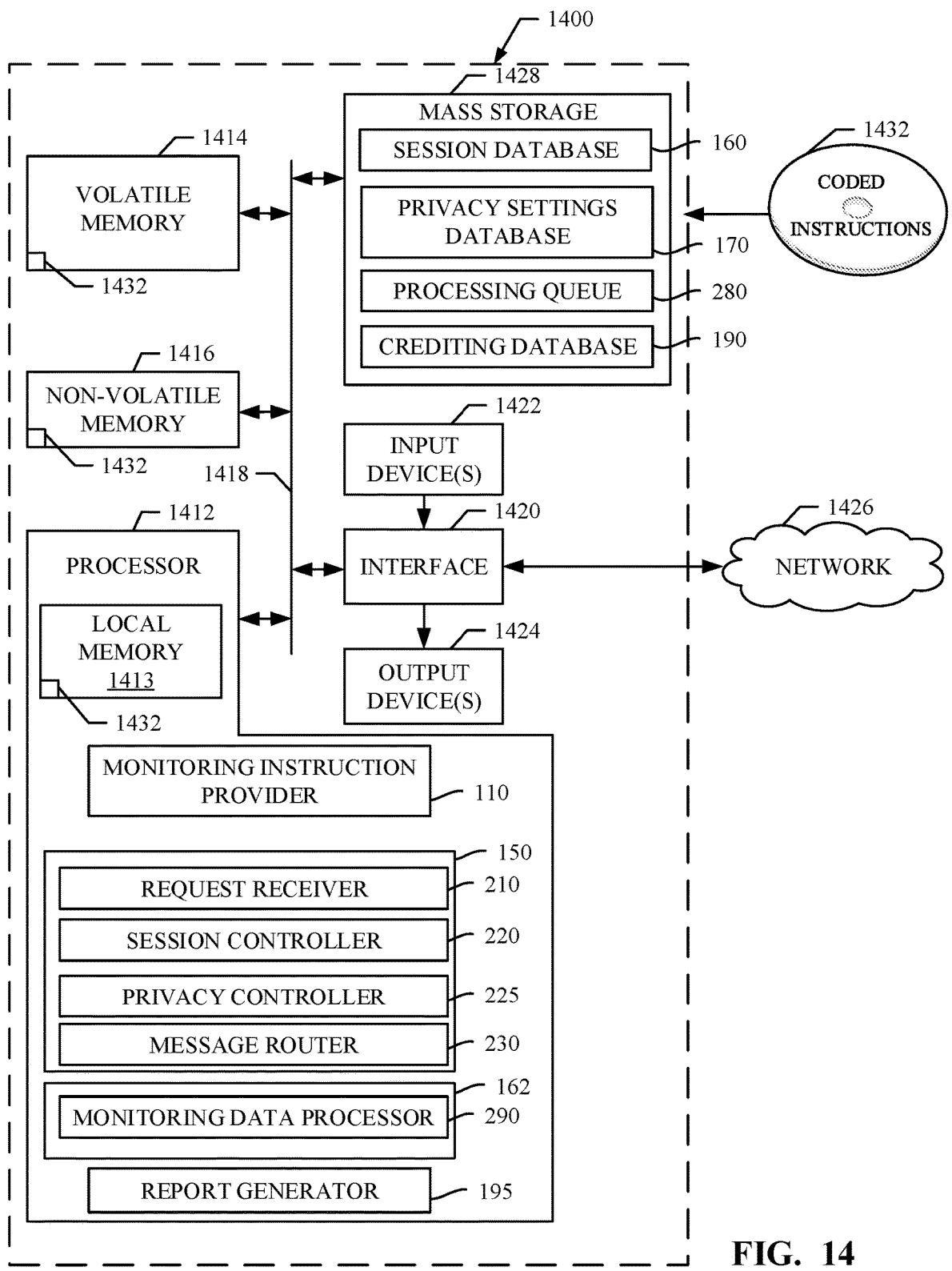
FIG. 14 is a block diagram of an example processor platform structured to execute the example machine readable instructions of FIGS. 10, 11, and/or 12 to implement the example central facility of FIGS. 1, 2A, and/or 2B.

FIG. 14 is a block diagram of an example processor platform 1400 capable of executing the instructions of FIGS. 10, 11, and/or 12 to implement the example central facility 105 of FIG. 1. The processor platform 1400 can be, for example, a server, a personal computer, an Internet appliance, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache), and executes instructions to implement the example monitoring instruction provider 110, the example request receiver 210, the example session controller 220, the example privacy controller 225, the example message router 230, and/or, more generally, the example load balancer 150, the example monitoring data processor 290 and/or, more generally, the example impression processor 162, and/or the example report generator 195 of FIGS. 1, 2A, and/or 2B. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 8 and/or 9 may be stored in the mass storage device 1428, in the volatile memory 1414, in the non-volatile memory 1416, and/or on a removable tangible computer readable storage medium such as a CD or DVD. In examples disclosed herein, the mass storage device implements the example session database 160, the example privacy settings database 170, the example processing queue 280, and/or the example crediting database 190.

From the foregoing, it will be appreciated that the above disclosed methods, apparatus and articles of manufacture coordinate receipt of monitoring information from client devices. As a result of using an impression processor identifier included in a session identifier used by a media device when reporting monitoring information, multiple impression processors can be used. Using multiple impression processors enables scaling for varying amounts of media devices (e.g., one hundred thousand media devices, one million media devices, ten million media devices) reporting monitoring information. Such dynamic scaling ensures that the reported monitoring information is handled in a timely fashion and handled without loss of monitoring information reported by those media devices. As a result of the load balancing functionality provided by the example load balancer disclosed herein, messages are more efficiently routed to various impression processors for processing. In examples disclosed herein, messages associated with a same session are routed to a same impression processor by the example load balancer based on an impression processor identifier. Routing messages to the same impression processor reduces the likelihood that an incoming monitoring message will be picked up by multiple impression processors and inadvertently double counted (e.g., if a single processing queue were used for multiple impression processors). In examples disclosed herein, impression processors can be brought online dynamically to scale with an amount of monitoring messages being received at a given time. As a result, processing resources are utilized more efficiently, as impression processors are not sitting idle waiting for incoming monitoring information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to coordinate receipt of monitoring information, the method comprising:
   in response to a first received message requesting a first session identifier, creating, by executing an instruction with a processor of a load balancer, the first session identifier including an impression processor identifier, the impression processor identifier to identify an impression processor to process subsequent messages that include the first session identifier, the first message including at least one of a user identifier or a device identifier identifying a media device;
   performing a lookup using the at least one of the user identifier or the device identifier to determine if collection of monitoring information is permitted;
   in response to determining that the collection of monitoring information is not permitted, transmitting an opt-out instruction to the media device, the opt-out instruction to inform the media device that the collection of monitoring information is not permitted;
   in response to determining that the collection of monitoring information is permitted:
      transmitting, by executing an instruction with the processor, the first session identifier to a media device to be used by the media device when transmitting the subsequent messages; and
      routing, by executing an instruction with the processor, the first received message to the impression processor identified by the first session identifier, the impression processor to credit a media presentation identified in a payload of the first received message; and
   in response to a second received message requesting that a session be terminated:
      routing, by executing an instruction with the processor, an indication of a termination of the session to the impression processor identified by the first session identifier, the impression processor to terminate crediting of a media presentation identified in a payload of the first received message; and
      transmitting, by executing an instruction with the processor, an acknowledgement of the termination of the session to the media device.

2. The method of claim 1, further including, in response to a third received message:
   extracting a second session identifier from the third received message; and
   routing the third received message to the impression processor when the second session identifier includes the impression processor identifier.

3. The method of claim 2, further including comparing a difference between a time of receipt of the third received message and a time of receipt of a prior message using the first session identifier to a threshold, wherein the routing occurs when the difference is below the threshold.

4. The method of claim 3, further including, in response to a determination that the difference is greater than the threshold, transmitting a timeout instruction from the load balancer to the media device, the timeout instruction to cause the media device to request a new session identifier.

5. The method of claim 4, wherein the timeout instruction is further to cause the media device to re-transmit the monitoring information transmitted in the third received message.

6. The method of claim 1, wherein the opt-out instruction is further to cause the media device to request user permission to enable monitoring.

7. The method of claim 1, wherein the first received message further includes an application identifier, and the performing of the lookup is further based on the application identifier.

8. At least one tangible machine-readable storage disks or storage devices comprising instructions which, when executed, cause a load balancer of a central facility to at least:
   in response to a first received message requesting a first session identifier, create the first session identifier including an impression processor identifier, the impression processor identifier to identify an impression processor to process subsequent messages that include the first session identifier, the first message including at least one of a user identifier or a device identifier identifying a media device;
   perform a lookup using the at least one of the user identifier or the device identifier to determine if collection of monitoring information is permitted;
   in response to determining that the collection of monitoring information is not permitted, transmit an opt-out instruction to the media device, the opt-out instruction to inform the media device that the collection of monitoring information is not permitted;
   in response to determining that the collection of monitoring information is permitted:
      transmit the first session identifier to a media device to be used by the media device when transmitting the subsequent messages; and
      route the first received message to the impression processor identified by the first session identifier, the impression processor to credit a media presentation identified in a payload of the first received message; and
   in response to a received message requesting that a session be terminated:
      route an indication of a termination of the session to the impression processor identified by the first session identifier, the impression processor to terminate crediting a media presentation identified in a payload of the first received message; and
      transmit an acknowledgement of the termination of the session to the media device.

9. The one or more tangible machine-readable storage disks or storage devices of claim 8, wherein the instructions, when executed, cause the load balancer to, in response to a third received message:
- extract a second session identifier from the third received message; and
- route the third received message to the impression processor when the second session identifier includes the impression processor identifier.

10. The one or more tangible machine-readable storage disks or storage devices of claim 9, wherein the instructions, when executed, cause the load balancer to compare a difference between a time of receipt of the third received message and a time of receipt of a prior message using the first session identifier to a threshold, and wherein the routing occurs when the difference is below the threshold.

11. The one or more tangible machine-readable storage disks or storage devices of claim 10, wherein the instructions, when executed, cause the load balancer to, in response to a determination that the difference is greater than the threshold, transmit an timeout instruction from the load balancer to the media device, the timeout instruction to cause the media device to request a new session identifier.

12. The one or more tangible machine-readable storage disks or storage devices of claim 11, wherein the timeout instruction is further to cause the media device to re-transmit the monitoring information transmitted in the third received message.

13. The one or more tangible machine-readable storage disks or storage devices of claim 8, wherein the opt-out instruction is further to cause the media device to request user permission to enable monitoring.

14. The one or more tangible machine-readable storage disks or storage devices of claim 8, wherein the first message further includes an application identifier, and the performing of the lookup is further based on the application identifier.

15. An apparatus to coordinate receipt of monitoring information, the apparatus comprising:
- a request receiver to receive a first message from a media device, the first message requesting a first session identifier, the first message including at least one of a user identifier or a device identifier identifying a media device;
- a privacy controller to perform a lookup using the at least one of the user identifier or the device identifier to determine if collection of monitoring information from the media device is permitted, the privacy controller to in response to determining that the collection of monitoring information is not permitted, transmit an opt-out instruction to the media device, the opt-out instruction to inform the media device that the collection of monitoring information is not permitted;
- a session controller to, in response to the first message, create the session identifier including an impression processor identifier, the impression processor identifier to identify an impression processor to process subsequent messages that include the first session identifier, the session controller to, in response to determining that the collection of monitoring information is permitted, inform the media device of the first session identifier to be used when transmitting the subsequent messages, the session controller to, in response to a second received message requesting that a session be terminated, route an indication of a termination of the session to the impression processor identified by the first session identifier, the impression processor to terminate crediting a media presentation identified in a payload of the first received message; and
- a message router to route the first message to the impression processor identified by the first session identifier, the impression processor to credit a media presentation identified in a payload of the first message, the message router to, in response to the second received message requesting that the session should be terminated, transmit an acknowledgement of the termination of the session to the media device.

16. The apparatus of claim 15, wherein the request receiver is further to extract a second session identifier from a third message received after the first message, the message router to route the third message to the impression processor when the second session identifier includes the impression processor identifier.

17. The apparatus of claim 15, wherein the opt-out instruction is further to cause the media device to request user permission to enable monitoring.

18. The apparatus of claim 15, wherein the first message further includes an application identifier, and the performing of the lookup is further based on the application identifier.

* * * * *